(12) United States Patent
Risberg et al.

(10) Patent No.: US 9,860,588 B2
(45) Date of Patent: Jan. 2, 2018

(54) IMPLIED MEDIA NETWORKS

(71) Applicant: Actiwave AB, Solna (SE)

(72) Inventors: Pär Gunnars Risberg, Solna (SE); Landy Toth, Newton, PA (US)

(73) Assignee: CIRRUS LOGIC, INC., Austin, TX (US)

(*) Notice: Subject to any disclaimer, the term of this patent is extended or adjusted under 35 U.S.C. 154(b) by 0 days.

(21) Appl. No.: 14/400,080

(22) PCT Filed: May 8, 2013

(86) PCT No.: PCT/US2013/040090
§ 371 (c)(1),
(2) Date: Nov. 10, 2014

(87) PCT Pub. No.: WO2013/169868
PCT Pub. Date: Nov. 14, 2013

(65) Prior Publication Data
US 2015/0100991 A1    Apr. 9, 2015

Related U.S. Application Data

(60) Provisional application No. 61/644,164, filed on May 8, 2012.

(51) Int. Cl.
*H04N 7/18* (2006.01)
*H04N 21/436* (2011.01)
(Continued)

(52) U.S. Cl.
CPC ... *H04N 21/43615* (2013.01); *H04L 65/4076* (2013.01); *H04L 65/60* (2013.01);
(Continued)

(58) Field of Classification Search
CPC .................. H04N 21/2401; H04N 21/8547
(Continued)

(56) References Cited

U.S. PATENT DOCUMENTS

2006/0149850 A1* 7/2006 Bowman ............... G11B 27/10
709/231
2009/0164576 A1   6/2009 Noh et al.
(Continued)

OTHER PUBLICATIONS

International Search Report and Written Opinion issued in corresponding application No. PCT/US2013/040090 dated Oct. 15, 2013.
(Continued)

*Primary Examiner* — Gigi L Dubasky
(74) *Attorney, Agent, or Firm* — Carter, DeLuca. Farrell & Schmidt, LLP

(57) ABSTRACT

A system and/or media network for rendering a media stream from one or more media rendering devices is disclosed. The media network may include one or more configurable peers, each configurable peer configurable as a rendering device, an observer, a processing device, a combination thereof, or the like. The system may be particularly suitable for use in remote locations, to generate a controlled and/or shared meeting topology within an uncontrolled media environment, and/or to generate an intense sound field amongst a group of participants from a collection of associated peers.

19 Claims, 9 Drawing Sheets

(51) Int. Cl.
  *H04L 29/08* (2006.01)
  *H04L 29/06* (2006.01)
  *H04N 21/439* (2011.01)
  *H04N 21/442* (2011.01)
  *H04N 7/10* (2006.01)

(52) U.S. Cl.
  CPC ............ *H04L 65/601* (2013.01); *H04L 65/80* (2013.01); *H04L 67/104* (2013.01); *H04L 69/24* (2013.01); *H04N 7/106* (2013.01); *H04N 21/439* (2013.01); *H04N 21/44227* (2013.01)

(58) Field of Classification Search
  USPC .......................................................... 725/80
  See application file for complete search history.

(56) References Cited

U.S. PATENT DOCUMENTS

| | | | |
|---|---|---|---|
| 2009/0198829 A1 | 8/2009 | Sengupta et al. | |
| 2009/0287652 A1 | 11/2009 | Chen et al. | |
| 2010/0194863 A1* | 8/2010 | Lopes et al. | 348/50 |
| 2011/0060798 A1 | 3/2011 | Cho et al. | |
| 2012/0110167 A1 | 5/2012 | Joch et al. | |
| 2012/0117225 A1* | 5/2012 | Kordasiewicz | H04L 65/1083 709/224 |
| 2013/0173742 A1* | 7/2013 | Thomas et al. | 709/217 |

OTHER PUBLICATIONS

Chinese Second Office Action corresponding to counterpart Int'l Appln. No. CN 2013800245939 dated Apr. 6, 2017, 12 pages.
Non-patent literature titled "Guidelines for Program Development", dated Sep. 30, 2010, 4 pages with English Abstract.
European Office Action dated Oct. 25, 2017 in corresponding European Patent Application No. 13724679.9, 7 pages.
Allegro Software Development Corporation, "Networked Digital Media Standards. A UPnP/DLNA Overview," Oct. 26, 2006, pp. 1-25, retrieved from the Internet: URL:http://www.allegrosoft.com/downloads/UPnP_DLNA_White_Paper.pdf, retrieved on Jan. 20, 2009.
Chinese Office Action dated Nov. 3, 2017 in corresponding Chinese Patent Application No. 201380024593.9 together with English translation, 14 pages.

* cited by examiner

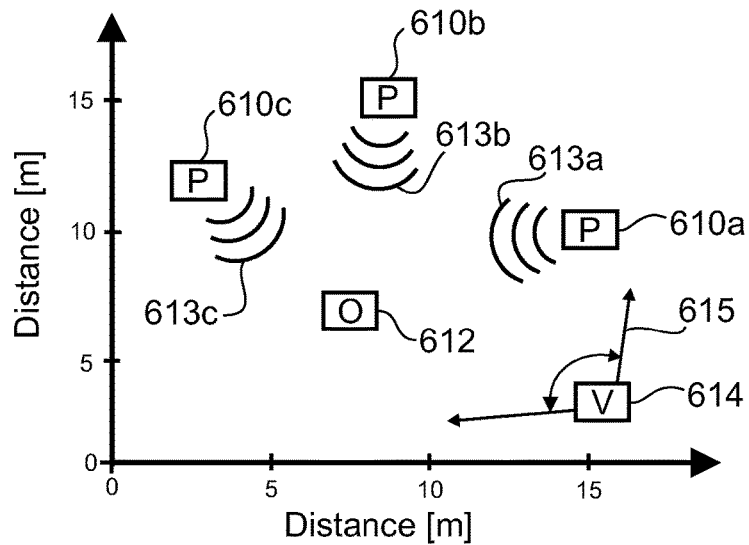
Fig 6
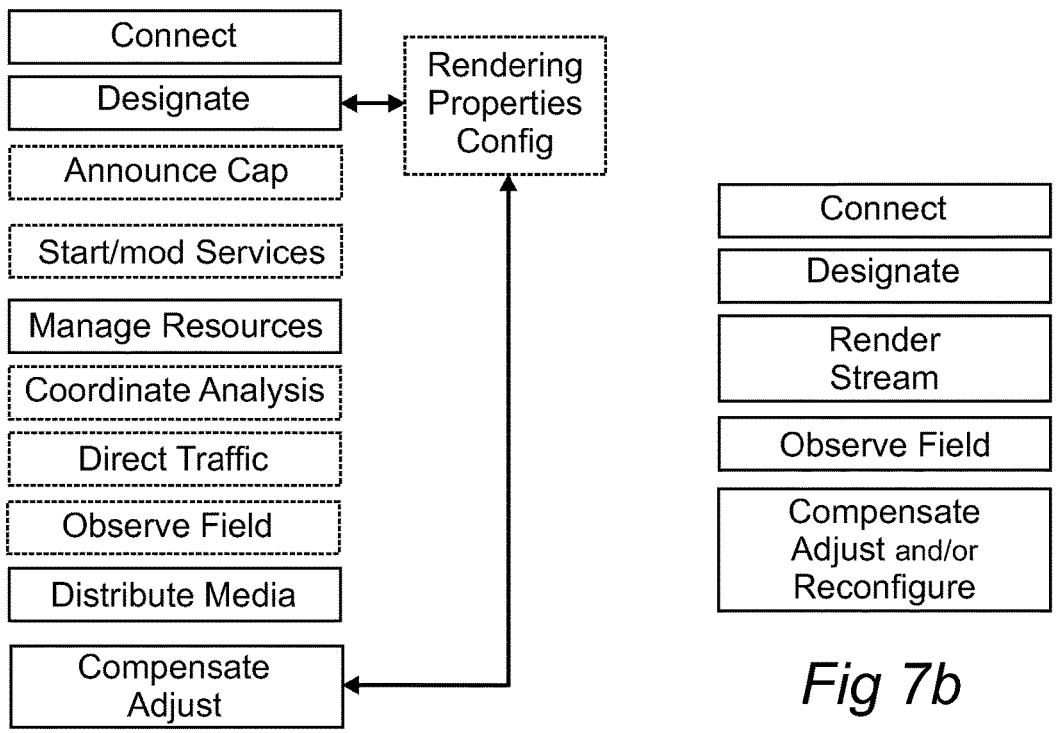
Fig 7a
Fig 7b

IMPLIED MEDIA NETWORKS

CROSS REFERENCE TO RELATED APPLICATIONS

The present application is a U.S. National Stage Application claiming the benefit of and priority to PCT International Application No. PCT/US2013/040090 filed May 8, 2013, which claims benefit of and priority to U.S. Provisional Application Ser. No. 61/644,164 filed on May 8, 2012, the entire contents of each of which are incorporated by reference herein for all purposes.

BACKGROUND

Technical Field

The present disclosure is directed towards networks, systems, and methods for forming media networks from loosely coordinated media rendering devices. More specifically, the disclosure is directed towards networks, systems, and methods for generating a shared audio sound field amongst a collection of audio rendering devices.

Background

Mobile technologies and consumer electronic devices (CED) continue to expand in use and scope throughout the world. Several aspects of professional media systems (audio and visual systems) that have been traditionally implemented with expensive, custom installations may potentially be implemented in consumer applications with the advent of more cost effective mobile and consumer electronic technologies. In parallel with continued proliferation of CEDs, there has been rapid technical advance of device hardware and components, leading to increased computing power and incorporation of new peripherals onboard devices along with reductions in device size, power consumption, etc.

In many circumstances, such devices lack the basic sound quality necessary for providing a truly high fidelity sound experience. Audio experience is just one of many factors considered in the design of consumer electronic devices. Often, the quality of audio systems, loudspeakers, etc. are compromised in favor of other design factors such as cost, visual appeal, form factor, screen real-estate, case material selection, hardware layout, and assembly considerations amongst others. Many of these competing factors are favored at the expense of the audio quality, as determined by the audio drivers, component layout, loudspeakers, material and assembly considerations, housing design, etc.

In addition, consumers continue to demand more streamlined experiences, without the hassle of configuration, product specific setup, and training. In many cases, a consumer may expect a new device work immediately out of the box. Multiple configuration steps necessary to establish and maintain communication between devices may adversely affect user experience and potentially turn away new customers.

Network topologies for streaming media to one or more rendering devices continue to evolve and standardize. Thus emerging network configurations for maintaining functions important for media consumption are becoming more widely available (e.g. audio over IP solutions, standards network implementations, etc.).

Related to conferencing applications, simultaneous translation may be provided with specialized headsets and FM transceivers. Adoption and use of these systems is often limited by the number of available channels, the need for application specific hardware necessary for implementation, and the associated costs. Participants without the specific hardware may not be able to access the translated broadcasts. Furthermore, such systems are often unidirectional broadcasts and may not be configured to provide free flow of discussion between participants.

Such media network components must routinely handle a range of signal types (e.g. audio signals, video signals, sensory data, etc.), arising from a variety of sources.

Systems and devices issues as described above are of particular relevance to the areas of audio processing, video processing and telemetry applications.

SUMMARY

One objective of this disclosure is to provide an efficient and cost-effective media rendering network. Another objective is to generate a controlled sound field from a loosely coordinated network of rendering devices. Yet another objective is to provide a media network configured to minimize user setup requirements and maximize ease-of-use. Yet another objective is to provide a media network for recording a media field in a venue. Another objective is to provide a media network for automatically coordinating the rendering of a media stream from a plurality of peers on the network. Yet another objective is to provide a media network for generating a shared sound field amongst a collection of peers.

The above objectives are wholly or partially met by networks, systems, and methods according to the appended claims in accordance with the present disclosure. In particular, features and aspects of the present disclosure are set forth in the appended claims, in the following description, and in the annexed drawings.

According to aspects of the present disclosure there is provided, a method for rendering a media stream with one or more peers over a network including designating one or more of the peers as rendering devices for rendering the media stream, each rendering device including at least one rendering property affecting the rendering of media therefrom; providing network connections between one or more peers, the connections supporting a media service; providing the media stream to at least one of the peers; distributing at least a portion of the media stream or a stream generated therefrom to each of the rendering devices; and compensating for at least one of the rendering properties on at least a portion of the media stream or a stream generated therefrom.

The step of compensating may be performed by the media service, and/or at least one of the peers. The media service may coordinate and/or synchronize the media rendering on one or more of the rendering devices. One or more of the rendering parameters may be a latency parameter, an acoustic parameter, an audio lag, an audio spectral response, an audio glitch, an echo, a sound pressure level, combinations thereof, and the like. The step of compensating may include adjusting the latency parameter to synchronize the media rendering on one or more of the rendering devices.

One or more of the peers may report one or more parameters relating to one or more of its rendering properties, computational capabilities, available resources, available energy reserve, and/or a combination thereof to one or more peers on the local area network.

The step of determining the location of one or more peers in the network may be performed using a localization algorithm in accordance with the present disclosure. The method may include listening to the rendered media generated by one or more of the peers. The listening may be used as an input to the localization algorithm.

According to aspects of the present disclosure there is provided a media network for rendering a media stream, including a plurality of peers connected via a local area network, at least one peer configured as a rendering device including one or more rendering properties, the rendering device configured to accept at least a portion of the media stream or a stream generated therefrom and to produce an individual rendered stream, the relationship between the accepted stream and the individual rendered stream dependent upon the rendering properties; and a media service configured to distribute at least a portion of the media stream or a stream generated therefrom over the local area network to the rendering device, the media service and/or one or more of the peers configured to calculate a compensation factor for and/or adjust at least a portion of the media stream to compensate for at least one rendering property of the rendering device so as to adjust the individual rendered stream.

One or more of the peers may be a consumer electronics device. Some non-limiting examples of a consumer electronic device include a smartphone, a tablet computer, a stereo sound system, a loudspeaker, a television, a headset, a heads up display, a combination thereof, or the like.

According to aspects of the present disclosure there is provided a media network for generating a controlled and/or shared media field within an environment from a media stream, the media network including a plurality of peers connected via a local area network, one or more peers arranged at physical locations within the environment; a media service to distribute the media stream and/or streams generated therefrom over the local area network to one or more of the peers; one or more of the peers configured as rendering devices, one or more of the rendering devices configured to receive an input stream and to render at least a portion of the input stream to form a local rendered stream, the local rendered stream contributing to the media field; and one or more of the peers configured as an observer, at least one of the observers configured to evaluate at least a portion of the media field at the corresponding physical location, and to generate a correction signal and/or a source signal therefrom.

One or more peers and/or the distribution system may be configured to adjust one or more of the local rendered streams based on the correction signal.

One or more of the observers may include a microphone to evaluate an audio aspect of the media field, a light sensor to evaluate a visual aspect of the media field, and/or a chemical sensor to evaluate an olfactory aspect of the media field.

One or more peers may be a source and/or a user input device, configured to generate the media stream. The media stream may include spatial distribution information pertaining to how the media stream is meant to be played at one or more locations in the media field.

The media network may include a camera, a stereoscopic camera, and/or a 3D camera system to characterize the location of one or more of the peers and/or the location of a user with respect to one or more of the peers. By user is meant a human who may interact with the media network via one or more peers.

One or more of the rendering devices may be configured to play different portions of the stream dependent on their physical location within the environment.

One or more observers and/or rendering devices may be configured to move throughout the environment (i.e. configured as a mobile peer within the media network).

The media network may include a localization algorithm configured to determine the location of one or more peers within the environment. One or more peers may include a WiFi module, a near field communication sensor, an audio localization system, and/or an LED based communication system, configured to provide signals to the localization algorithm.

According to aspects of the present disclosure there is provided a media network for rendering a media stream, including: a plurality of peers connected via a local area network, one or more peers configured as rendering devices, each rendering device including one or more rendering properties, each of the rendering devices configured to receive an input stream and to render at least a portion of the input stream to produce an individual rendered stream, the individual rendered stream dependent upon the rendering properties; and a media service configured to distribute at least a portion of the media stream over the local area network to the rendering devices, one or more of the peers, and/or the media service configured to adjust one or more individual rendered stream to compensate for at least one rendering property of at least one rendering device.

One or more of the peers may be configured as a media source, the media source configured to provide the media stream to one or more peers via the media service. One or more of the peers may be configured to provide a portal to a wide area network configured to receive or send at least a portion of the media stream.

The media service may include a real-time transport protocol configured to synchronize two or more of the individual rendered streams.

The media network may include one or more observers in accordance with the present disclosure each arranged at a location within the media field. One or more observers may be configured to monitor the media field to generate a correction signal, the media service configured to receive the correction signal.

The media network may include a compensation algorithm, the compensation algorithm configured to generate a virtual peer at a predetermined location within the media field.

According to aspects of the present disclosure there is provided a media network for rendering a media stream, including: a plurality of peers connected via a local area network; a media service configured to distribute at least a portion of the media stream or a stream derived therefrom over the local area network to one or more of the peers; and an automatic or semiautomatic configuration service configured to generate a selection criteria based upon one or more network configuration parameters; at least one of the peers selectively configurable as a rendering device for rendering the media stream based upon the selection criteria.

One or more of the peers may be selectively configurable as an observer for assessing quality criteria for the media stream. One or more of the configuration parameters may depend on the quality criteria. One or more of the configuration parameters may include a location parameter, a social parameter, a capabilities parameter, and/or combinations thereof.

The media network may include a spatially organized group, the spatially organized group may be defined by a spatially organized zone, and one or more of the peers located within the zone defined by the spatially organized group.

One or more of the peers configured to interact with a user and/or locate a user within the media field. The selection criteria may be dependent upon a network topological configuration, proximity between one or more of the peers, proximity between one or more peers and the user, and/or proximity between one or more of the peers and the spatially organized group.

The media service may include a localization algorithm configured to determine the location of one or more of the peers within the media network. The media network may include one or more proximity sensors, each proximity sensor configured to generate a location signal. The localization algorithm may be configured to accept one or more of the location signals. Some non-limiting examples of proximity sensors include a WiFi module, a near field communication module, an infrared sensor, an LED, a microphone, combinations thereof, and the like.

According to aspects of the present disclosure there is provided a method for rendering a media stream including: connecting a plurality of peers via a local area network including one or more configuration parameters; distributing at least a portion of the media stream or a stream derived therefrom over the local area network to one or more of the peers; generating a selection criteria based upon one or more of the configuration parameters; configuring one or more of the peers as a rendering device for rendering the media stream based upon the selection criteria; and rendering at least a portion of the media stream with the rendering device.

According to aspects of the present disclosure there is provided a method for generating a controlled and/or shared media field from a media stream including: providing a plurality of rendering devices connected over a local area network; rendering at least a portion of the media stream and/or signals generated therefrom on each of the rendering devices to produce a plurality of localized media fields; monitoring the localized media fields at one or more locations within an audible and/or visual range of at least one of the rendering devices; and adjusting the rendering of at least one of the rendering devices to control the media field based on the monitoring.

The monitoring may be provided by an observer in accordance with the present disclosure.

The method may include reconfiguring one or more of the rendering devices based upon the step of monitoring.

The method may include synthesizing a wave-field with one or more of the rendering devices and correcting the wave field based upon the monitoring.

According to aspects of the present disclosure there is provided use of a media network in accordance with the present disclosure and/or a method in accordance with the present disclosure in a hotel setting, a hospital setting, a concert setting, an auditorium, a home setting, an office setting, and/or combinations thereof.

According to aspects of the present disclosure there is provided a media network for rendering a media stream including: a plurality of peers connected via a local area network including one or more configuration parameters; a media service configured to distribute at least a portion of the media stream or a stream derived therefrom over the local area network to one or more of the peers; and a configuration service configured to connect and/or disconnect one or more peers and/or one or more prospective peers to/from the network based upon the configuration parameters, at least one of the peers selectively configurable as a rendering device for rendering the media stream based upon the configuration parameters.

According to aspects of the present disclosure there is provided a method for rendering a media stream including: connecting a plurality of peers via a local area network including one or more configuration parameters; distributing at least a portion of the media stream or a stream derived therefrom over the local area network to one or more of the peers; generating a selection criteria based upon one or more of the configuration parameters; configuring one or more of the peers as rendering devices for rendering the media stream based upon the selection criteria; and rendering at least a portion of the media stream with at least one of the rendering devices.

According to aspects of the present disclosure there is provided a method for recording a media field in a venue including: monitoring the media field at a plurality of locations throughout the venue to generate a plurality of individual media streams; determining the coordinates of the plurality of locations throughout the venue; and recording one or more of the individual media streams and one or more of the locations onto a storage medium.

The step of listening may be performed by one or more microphones, each microphone positioned at one of the locations. The microphones may be included in one or more peers in accordance with the present disclosure, each of the peers may be connected by a media network in accordance with the present disclosure. One or more of the peers may be a consumer electronics device (e.g. a tablet computer, a smartphone, an iPhone, etc.).

The step of determining the coordinates may be performed by a localization algorithm in accordance with the present disclosure.

BRIEF DESCRIPTION OF THE DRAWINGS

Several aspects of the disclosure can be better understood with reference to the following drawings. In the drawings, like reference numerals designate corresponding parts throughout the several views.

FIG. 6 shows aspects of a media network in accordance with the present disclosure including a visualization device.

FIGS. 7a-b show methods of establishing connections to and rendering media on a media network in accordance with the present disclosure.

DETAILED DESCRIPTION

Figure 1:
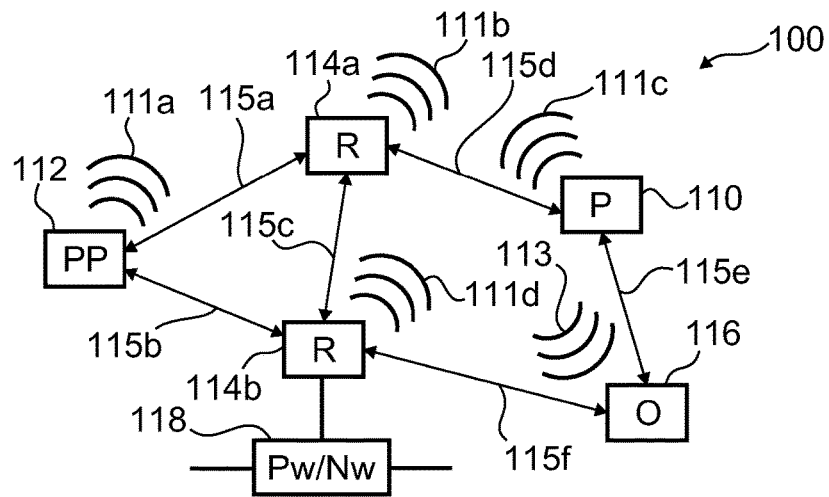
FIG. 1 shows aspects of a media network in accordance with present disclosure.

Particular embodiments of the present disclosure are described hereinbelow with reference to the accompanying drawings; however, the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. Like reference numerals may refer to similar or identical elements throughout the description of the figures.

Some aspects described herein are associated with "arbitrary" sampling rates (e.g., arbitrary source or destination sampling rates). As used here, the term "arbitrary" may refer to any sampling rate that is not pre-determined (e.g., that is not known when a sample rate conversion system is designed). It is understood that in other some other aspects described herein the sampling rates may also pertain to "fixed rate" and predetermined sample rate implementations.

Moreover, as used herein lowercase variables will declare sequences in the time domain, while uppercase variables will declare frequency representations (e.g., x is a sequence represented in the time domain while X is the same variable represented in the frequency domain). The subscript $\square_n$ is used to represent the time index of sequences in the time domain (e.g. $x_n$). Different subscript letters are used to represent different sample rates related to a time index of sequences in the time domain (e.g. $x_n$, $y_b$, $z_k$, etc.).

Media networks, implied media networks, and implied audio networks in accordance with the present disclosure may be created amongst a plurality of rendering devices such as loudspeaker stacks, home media centers, local broadcasting systems, consumer electronic devices, etc. Some non-limiting examples of consumer electronic devices include an active loudspeaker, an amplifier, a cellular phone (e.g. a smartphone), a tablet computer, a laptop computer, a portable media player, a television, a portable gaming device, a gaming console, a gaming controller, a remote control, an appliance (e.g. a toaster, a refrigerator, a bread maker, a microwave, a vacuum cleaner, etc.), a power tool (a drill, a blender, etc.), a robot (e.g. an autonomous cleaning robot, a care giving robot, etc.), a toy (e.g. a doll, a figurine, a construction set, a tractor, etc.), a greeting card, a home entertainment system, etc.

In some aspects, an audio rendering device may participate in the media network, even if configured with an exceedingly low cost audio transducer. In this non-limiting example, the low cost audio rendering device may accept a low latency preprocessed signal for immediate rendering.

In the case of a mobile or battery operated consumer electronic device, such as a portable gaming device, the device (i.e. the audio rendering device) may be configured to enhance the shared sound field locally while minimizing power usage, thus extending the battery life, reducing onboard heat generation, etc.

As used herein, the term "local media/sound field" may refer to the media/sound field produced by and in the vicinity of one or more peers in a media network in accordance with the present disclosure. The term "shared media/sound field" may refer to the media/sound field observed and/or rendered by a plurality of peers in the network.

A media network may include a plurality of peers. Each peer may be configured to provide a function to support network operation, provide computational resources, render of one or more media streams on the network, and/or observe rendered media within the shared media field of the network.

In one non-limiting example the media network may support a media streaming aspect (e.g. a media service) as described herein to distribute media to one or more peers in the media network. The media streaming aspect and/or timing aspects may be coordinated by a media network or one or more service layers therein. Some non-limiting examples of time coordinating services may be included in a precision time protocol (PTP), RAVENNA, Dante, Android@home, AirPlay, Sonos Networks, combinations thereof, and the like.

The media network may include a localization aspect (e.g. a localization algorithm) used to determine the particular location of one or more peers in the network. The localization aspect of the network may feed one or more functions, services and/or parameters of the media streaming aspect.

The media network may include one or more links to other networks, such as social networks, wide area networks, peer to peer networks, messaging networks, smart energy networks, home appliance networks, etc. whereby one or more peers in the media network may communicate privately with one or more peers in the other network or within the media network via one or more media types (e.g. audio, text, video, sound, emoticon, etc.).

The media network may include one or more media enhancement aspects (e.g. an audio enhancement system, audio enhancement algorithms, etc.) in accordance with the present disclosure. The media enhancement aspects may include services for synchronizing media transfer between one or more peers (rendering devices, general peers, etc.), correcting for latency associated with one or more rendering device, a network related latency, correcting for position of one or more peers in the network, compensation for one or more rendering property of a peer in the media network, movement of one or more peers within a shared media field generated by one or more peers in the media network, or the like.

In one non-limiting example the media network may include one or more media services to determine and/or direct aspects of a media stream (e.g. one or more audio channels, one or more audio bands, photo renderings, orchestral instrumentation, etc.), to one or more peers in the media network. Different peers in the media network may receive alternative media streams, different aspects of media streams, and the like. One or more peers may be configured to repeat streams so as to effectively transfer them throughout the network during use. Such retransmission may be used to extend the network over a larger operating environment (i.e. such as between rooms in a multi-room environment, between wireless network spaces, etc.). In one non-limiting example one or more wired peers may be used to transfer data between two or more otherwise unconnected wireless sub-groups within the media network.

The media network may include one or more quality of service algorithms to compensate for high latency rendering devices. In one non-limiting example the network may include a quality of service configured so as to set a maximum latency parameter dependent on the media stream, operating environment, and/or one or more peer capabilities on the network. In one non-limiting example a musical audio stream may be configured with a longer latency parameter while an audio-visual stream may be configured with a shorter latency parameter so as to better synchronize the audio and video aspects of the stream. The quality of service algorithm may be configured so as to automatically reconfigure the latency parameter depending on the network configuration and/or the content of the media stream. A rendering device that cannot operationally maintain the necessary latency may be excluded in order for the network to deliver a high quality stream to a user. The latency and/or synchronization algorithms may be configured as adjustable such that highly accurate timing may be provided in a shared sound field but may be relaxed when inter-group cross talk is not as important (such as between rooms in a building, between hotel rooms, etc.).

The network may include one or more services (e.g. configuration services) for configuring and/or updating the latency parameter. In one non-limiting example, the service may be configured to provide sub-sample precision latency parameters. Such precise latency configurations may be advantageous for configuring highly accurate wave-field reproduction, adjusting wave propagation timing amongst multiple peers within a sound field, etc. In one non-limiting example, sub sample latency may be enabled in combination with an asynchronous sample rate converter (ASRC) in accordance with the present disclosure. The ASRC may be configured to up-sample incoming media streams so as to increase the time-resolution thereof as necessary for the intended application. Such a configuration may be advantageous for implementing highly accurate wave field synthesis with the media network, for implementing highly accurate delays (timing between samples).

The media network may support one or more distribution protocols, such as a pulse width modulated pre-compensation protocol in accordance with the present disclosure in order to alleviate the workload on one or more resource constrained peers in the network. Thus a PWM pre-compensation protocol may be used to alleviate resource requirements on the slowest devices, designating processing centers where resources are available (e.g. on a server, etc.). Additionally, alternatively, or in combination the network may include one or more distributed processing services configured to process one or more aspects of the media stream on any available peer one the network with available resources. Such a configuration may be advantageous for alleviating computational load from those devices that may be overly resource constrained (i.e. so as to allow those devices to just receive, play, respond, etc.).

The media network may include a configuration service to autonomously configure peers to render one or more aspects of a stream based upon one or more of the other services (a localization service, a network configuration service, etc.). In one non-limiting example, the media network may include an automatic configuration service for determining when a rendering device may transition from providing a first media stream or aspect thereof to another media stream or alternative aspect thereof (e.g. transitioning from a stereo stream to a left rear stream, transitioning from a first media stream to a second media stream, etc.).

The media network may include a watermarking service configured to watermark the one or more media streams, perhaps particular to a rendering source (e.g. watermarking the stream to identify that it has been rendered by a unique rendering source, etc.). The watermarking service may be configured to extract watermarks from an observed stream (e.g. as observed by a peer in the network) so as to determine contributions to the rendered stream by one or more rendering sources (e.g. peers configured so as to render the stream), triangulation of rendering sources in the media network, and the like.

Additionally, alternatively, or in combination, watermarking services may be configured to at least partially localize one or more rendering sources within the media network during operation and optionally at least some aspects of changes in the positioning of rendering sources within the media network during operation. One or more aspects of the watermark may include network credentials for automatic connection of perspective peers entering the sound field of the media network, in close proximity to the media network, a particular group and/or zone within the media network, etc.

One or more networks and/or concepts disclosed herein may be amendable for use with a range of network topologies. Some examples of network topologies include IP-based topologies, local area networks, etc. Generally speaking, the network topology may preferably provide characteristics such as low-latency, scalability, redundancy and synchronicity upon which the media network services may be provided. Some existing topologies that may provide adequate basic service functions and/or aspects thereof include RAVENNA, DLNA, HomePlay, HD-PLC, AirPlay, Android@Home, WiFi, Ethernet, LANs (wired or wireless), wireless topologies (star, tree, line, mesh, etc.).

The media network may communicate with a low data rate home appliance network such as provided by HomePlug and/or KNX. In one non-limiting example, the home appliance network may include an (optionally) low data rate transfer service for controlling appliances within a home and/or office setting (such as controlling lighting, blinds, thermostats, colorimetric lighting aspects, fan noise reduction, refreshment stations, etc.). The media network may include an environmental control service configured to adjust one or more appliances in an associated home appliance network. The environmental control service may be configured so as to automatically control one or more of the appliances based on one or more associated media streaming aspects and/or localization aspects. In one non-limiting example, room lighting may be automatically dimmed when a media stream (e.g. a movie) begins playback on a local rendering device (e.g. a television). Alternatively, room lighting may be adjusted to accommodate movement of a user throughout the media field (e.g. if a high priority peer moves through a media field, etc.).

The media network may include functionality for managing low level streaming operations, clock domain, sync information, etc. for use in an associated session description protocol. One or more aspects of the concepts may be layered upon one of the basic topologies described herein in order to add the necessary functionality for generating a media network in accordance with the present disclosure there upon (e.g. as an application-specific software module, etc.).

In one example, a real-time transport protocol (RTP) is used to provide streaming of media throughout the network, a subgroup, or the like. RTP may provide end-to-end network transport functions suitable for transmitting real-time data, such as audio, video, telemetered data, simulation data, etc. to one or more rendering devices in the network. The RTP may address resource reservation and/or guarantee quality-of-service for real-time services provided on the network. Alternatively, additionally, or in combination, such functions may be provided by an alternative network service, which may use the RTP for streaming functionality only. The data transport may be augmented by a control protocol (RTCP) to allow monitoring of the data delivery in a manner scalable to larger and/or ad hoc networks, and/or to provide minimal control and identification functionality as needed by the network. RTP and RTCP may be configured to be independent of the underlying transport and network layers. The protocol may support the use of RTP-level translators and mixers.

The RTP may be provided on top of a communication protocol such as TCP/IP or UDP/IP, which may provide several data services not necessarily provided by the IP layer such as providing port numbers to help distinguish different peer requests and, optionally, a checksum capability to verify that the data arrived at the intended designation intact.

A media stream delivered through the media network may be configured as a unicast stream, a multicast stream, may change destinations in real-time, and/or be split and only partially delivered to one or more rendering devices in the network. In general, multicast streams may provide more resource-efficient usage of network links and faster switching between available streams in situations, where a certain stream will be accessed at different locations (peers) within the network. Unicast streaming may be advantageous for linking peers within a sub-group, or region of the network for private conversation, messaging events, etc.

A peer configured to receive a stream (e.g. an observer, a rendering device, a general peer, etc.) may connect to any existing stream through an appropriate protocol (e.g. RTSP/SDP protocol, etc.). The receiving peer may then render one or more aspects of the stream (e.g. video, audio, a portion thereof, etc.) in accordance with the present disclosure. Information necessary to properly render the stream may be sent along with the stream (e.g. as part of the stream header, etc.) in order to conveniently adjust local aspects of the stream for rendering. Such information may include, channel selection, sound augmentation parameters, band width preferences, sound pressure level, preferred, delay (e.g. as provided by a spatialization/localization service, a microphone extracted timing delay, etc.). In one non-limiting example, a receiver may use a RTSP/SDP protocol, which is supported by a wide range of media players.

In aspects, a prospective device (a prospective peer, prospective source device and/or rendering device) may attempt to join the media network. The prospective device may then obtain a unique identifier (e.g. an IP address, etc.). The prospective device may announce its existence and advertise information about the available services that it may provide to the network (e.g. IP address and host name, supported protocols, access information, information about available streams, minimum performance guarantees, etc.). After the initial configuration, the prospective device may be promoted to peer status, becoming a peer in the media network. In one non-limiting example, service advertisement and discovery may be based on the DNS-SD protocol (e.g. within an IP based implementation, a RAVENNA implementation, etc.).

Streams may be provided without synchronization (e.g. when performing private communication between inter group members, etc.). Some streams may be multicast and thus subjected to a need for tightly controlled timing. Thus synchronization and timing delayed functionality may be provided on top of a phase-accurate synchronization service for media clocks (e.g. as per a timing synchronization standard, a precision time protocol, AES-11, etc.). The basic synchronization services may be provided by a lower level network topology such as RAVENNA, HomePlay, etc. onto which particular timing corrections based on spatialization/localization algorithms may be applied. Such timing corrections may be calculated at rendering devices, supporting peers, a source, etc. as such resources are available by the media network.

In one non limiting example, base level synchronization across all network nodes may be achieved through IEEE1588-2008 (Precision Time Protocol, PTPv2). PTPv2 may provide means for synchronizing local clocks to a precision in the lower nanoseconds range with reference to a related master clock, provided that all participating switches natively support PTPv2. Even without PTP support, the precision of an achievable base synchronization may be sufficient to reach sample accurate synchronization across each network node.

In some non-limiting examples, sample-accurate synchronization may be achieved across WAN connections (e.g. to virtual participants), when local master clocks on the media network and associated networks on the WAN are synchronized to GPS as a common time domain.

From a state of sample-accurate synchronization, the system may apply sound field corrective, feedback based, and/or localization algorithms in order to adjust the stream playback on rendering devices to account for local sound field effects. Such algorithms may be processed locally at one or more rendering devices, processed by one or more peers in the network with resource surpluses, processed in a shared manner across a plurality of peers in the network, etc. The algorithms may be applied with or alongside echo compensation algorithms, watermarking algorithms (e.g. one or more audio watermarks), etc.

A media network in accordance with the present disclosure may include one or more sound field corrective algorithms. In one non-limiting example the media may include a sound field corrective algorithm configured to automatically establish and/or adjust gain and delay settings for one or more peers (i.e. so as to optimize a 7.1 surround system configured from a loosely formed grouping of peers on the network). Optionally the network may include one or more algorithms for implementing active noise cancellation there upon. One or more peers may include a microphone so as to act as a sound field observer. The algorithm may be configured to accept feedback from such observers to further adjust the sound field produced by the media network.

The sound field correction algorithm may include aspects for adjusting the sound field based upon localization of one or more peers within the network. In one non-limiting example, the algorithm may be configured to adjust the sound field and/or reconfigure the rendering devices as a priority peer moves throughout the network space. In one usage scenario, the algorithm may be configured to adjust the playback of a media stream as a listener enters into a group within the media network. In one such example, the media may play through the ear-buds of a peer and smoothly transition to a home audio system as the peer enters into the associated home. One or more location services may be used to more accurately track a peer as it moves throughout the media network for use with an associated sound field adjustment algorithm.

In another usage scenario relating to a large venue, a sound field correction algorithm may be configured to delay playback on one or more mobile peers within the venue so as to match local playback with a wave-front produced by one or more fixed peers (e.g. the main sound stage, a large public announcement system, etc.). Such a configuration may be advantageous for generating synchronous, local sound enhancement without local delay, adding locally targeted media onto a base media stream, etc. The local nature of sound production from peers may further limit cross talk between sufficiently far away peers in the network (i.e. so as to minimize echo, reverb, etc. during playback).

A media network in accordance with the present disclosure may include one or more feedback based media correction algorithms. A feedback based media correction algorithm may accept one or more feedback signals from an observer in the media network and so as to locally correct for quality of service, enhance the local field, remove local echo, generate a wave-field, etc. In one non-limiting example, the algorithm may be configured for dynamic sound field correction where the sound-field is monitored locally by a microphone (e.g. on a smartphone, an iPhone® microphone, a fully characterized microphone, etc.) attached to and/or included in a peer in the network. The feedback based media correction algorithm may adjust the media stream or signal generated therefrom as played by one or more peers within the network (e.g. one or more fixed rendering devices, mobile rendering devices, stereo or surround sound stage, etc.), so as to follow (i.e. by proper channel gain, delay adjustment, etc.) the microphone as it moves throughout the associated media field (i.e. as a user moves throughout or between rooms, etc.). The feedback algorithm may accept one or more signals from an associated localization algorithm, from one or more visual localization algorithms (e.g. as obtained from a camera, a stereoscopic camera, a 3D camera, a Kinect camera, combinations thereof, etc.) to determine where in the media field a preferred peer is located (e.g. on a sofa, as multiple peers situated throughout the space, etc.). In one non-limiting example, a surround system may be implemented using one or more peers (e.g. a multi-channel peer, 7+1 individual peers, etc.).

Additionally, alternatively, or in combination, the correction algorithm may be configured to perform active noise cancellation at the site of the peer. The peer may observe the local sound field, and the associated corrective algorithm may determine how the perceived sound field differs from the intended sound field (i.e. as determined by one or more aspects of the media stream itself). The algorithm may add one or more noise cancelation aspects to the media stream or a signal generated therefrom so as to preferably adjust the local sound field at the priority peer.

The media network may include configurable spatialization services/algorithms to provide corrective media rendering data to the network in order to assist with various network functions (e.g. group formation, group maintenance, group peer exchange, sound field generation, sound field correction, etc.). Some suitable spatialization methods include ITD (Interaural Time Difference), ILD (Interaural Level Difference), HRTF (Head Related Transfer Function), combinations thereof, and the like.

Spatialization/localization algorithms may be operated locally in application specific hardware, audio processors, etc. on a peer, in a server, or the like. Such a configuration may be advantageous for reducing processor burden associated with calculating adequate time delays for a stream, etc.

An audio watermark may be embedded into one or more media streams and/or signals generated therefrom. The watermark may include a spread spectrum audio watermarking (SSW), a pseudonoise sequence, a timing signal, a quantization scheme, a two-set scheme, a patchwork scheme, amplitude modification, echo hiding, replica modulation, time-scale modification, beat-scaling transformations, synchronization modulation, zero-crossing synchronization, salient point extraction, a self-marking scheme, time based modulation schemes, combinations thereof, or the like. Non-blind watermarks (e.g. audible watermarks) may be incorporated for use in configuration, determining timing delays between peers in the network, etc. Such an audio watermark may be sent to one or more peers to assist with configuration of the network, localization of one or more peers in the network, etc. The selected scheme may be combined with one or more psychoacoustic models to consider inaudibility if desirable in the intended application. In one non-limiting example the media network includes a range of replica modulation based watermarks for application onto one or more media streams. The replica modulation based watermarks may be used as a basis function to configure the media network, identify peers on the network, communicate between peers on the network, identify the stream properties for one or more prospective peers, provide one or more identification codes, etc.

In one non-limiting example, the network may include one or more peers each configured with a personal rendering device (e.g. an ear bud, a cochlear implant, a wireless earphone, etc.). Thus the media network may be configured so as to provide sound field enhancements, overlay private conversations, etc. into each individual peers rendering stream (i.e. for playback on the associated personal rendering device). Such a configuration may be used to provide functionality such as real-time translation, wave-field synthesis, etc. in environments with a plurality of peers (where otherwise, local cross talk between peers may interfere with such functionality).

The audio rendering devices may be used to render a portion of a media stream (for example, to create a coordinated 3D sound field, to play those aspects of the media stream most suited to the device, to play those aspects most suited to the location of a listener, etc.).

One or more of the peers may include a feedback sensor (e.g. a microphone to sample various aspects of the local sound field, a colorimeter for determining local color field, an ambient light sensor, a camera, a photodetector, a wireless network sniffer, etc.). Such a peer may be configured as an observer. The observer may be configured to sample information from the local rendered media field for use by various algorithms and/or services in the media network.

One or more peers in the network may include a proximity sensor (e.g. GPS, an infrared sensor, an ultrasonic proximity sensor, a wireless network sniffer, or the like) to help establish positional relationships between peers in the network. The proximity sensor may be configured to generate proximity data that may be made available to the network for use in adjusting the media streaming aspects, as input to the localization aspects, exchanging credentials, or the like.

In aspects, one or more quality of service (QoS) algorithms may be used to assess the network during operation (e.g. at least some level of functionality may be provided by services such as DiffServ). DiffServ operates on the principle of traffic classification, where each data packet is placed into a limited number of traffic classes, rather than differentiating network traffic based on the requirements of an individual stream. Each traffic class may be managed differently, ensuring preferential treatment for higher-priority traffic on the network.

The traffic prioritization scheme may be in part based upon the underlying service structure. Different priorities may be assigned to different classes of traffic. Timing critical streams may receive the highest priority, followed by proximity based inter-device streams, real-time media traffic, control, and then configuration traffic. Lowest level traffic may receive the lowest (standard) priority and will be treated as best-effort traffic to be communicated when resources are available.

A media network in accordance with the present disclosure may include support for one or more groups or subgroups. A group or sub-group may be determined based on a spatial relationship between peers, a location in space, a social group, a peer priority, etc. Some non-limiting examples of groups and/or sub-groups are described throughout the disclosure. In one non-limiting example, a group may be associated with a location (e.g. such as within audio range of a sound field produced by select rendering devices on a media network, within a defined space, within a room, etc.). Each group and/or sub-group may include one or more administrators, one or more communicators (e.g. for inter group communication, etc.). An administrator may coordinate activity within a group, coordinate media transfer within a group, provide a beacon to identify the group, etc.

The media network may interface with one or more users and/or listeners. A user or listener implies a human observer and may or may not include a peer for interfacing with the network. One or more peers may be configured to interface with a user and/or listener so as to interact with the network, monitor network configurations, select media streams, etc.

The media network may be configured to automatically administer administrative rights, user priorities, etc. Such peer priority schemes may provide one or more peers on the media network with privileges such as the rights to listen, and/or render a media stream, message, broadcast a media stream, source a media stream, etc. Such privileges may be restricted to access within a sub-group, between peers within a sub-group, throughout the media network, etc. The privileges of a peer may be altered during use based on changing user or administrative preferences, changes in network configuration, changes in the media stream priorities, changes in the localization aspects of the peers in the media network, etc.

Such prioritization schemes may also be applied to general timing events within the network. Such timing events may be more highly prioritized amongst locally situated peers (e.g. perhaps pertaining to a proximity based sub-group) while being relaxed amongst remotely coordinated peers (e.g. such as peers in distinctly separated rooms in a hotel, a conference venue, etc.). Thus the overall requirements of the media network may be more optimally managed during use (i.e. so as to minimize overall power consumption, network performance requirements, etc. while maintaining acceptable quality of service).

One or more peers in the media network may include an audio enhancement system in accordance with the present disclosure. The audio enhancement system may include one or more parameters representative of the audio rendering properties of the peer. The media network may have an audio compensation service or algorithm that may accept one or more of these parameters. The parameters may be incorporated by the media network to execute the audio enhancement in real-time during the streaming of media there upon. In one non-limiting example, one or more aspects of the computation associated with the audio enhancement system may be computed on a peer with available resources in the media network. Such a configuration may be advantageous for lowering the processing load on the associated peer (e.g. so as to minimize power consumption thereupon, improve multitasking latency, etc.). The media network may be configured to shift the calculations from one peer to another based on one or more algorithms or services configured on the network (i.e. such as determined by physical proximity of peers in the network, passage of a peer from one sub-group to another, changing workload priorities, changing power availability, altered location of a listener, etc.). The parameter management may be performed by a configuration service on the network. In one non-limiting example, one or more peers on the network may upload associated rendering parameters in an encrypted form to a "processing" node on the network (e.g. a peer with available processing resources).

One or more peers in the media network may include a PWM precompensation system in accordance with the present disclosure. Such a configuration may be advantageous for providing high quality sound from a low cost rendering device in the media network. One or more audio enhancement calculations may be performed elsewhere in the media network so as to minimize the computational demand on such low cost rendering devices. Media network criteria and other related algorithms may be automatically configured to update at least one media streaming aspect (e.g. automatic latency control, local phase control in the broadcast on spec, etc.), to accommodate for local device deficiencies, etc. Some non-limiting aspects of PWM precompensation schemes are described throughout the disclosure. Such PWM precompensation approaches may be advantageous for implementing sound field improvements; media stream enhancements, peer deficiency correction, as well as implementation of one or more low cost rendering devices while maintaining a high quality sound field in the vicinity of the peers.

One or more peers may be configured to broadcast capabilities to the media network (e.g. such as sub-woofer capability, tweeter capability, audio band capabilities, power capabilities, etc.). The media network may include a configuration service to automatically configure the rendering devices within the media network. In one non-limiting example the media network may be configured to automatically adjust crossovers for the available rendering devices on the network.

One or more of the peers may include a sensor (e.g. a microphone, etc.) to provide a sensory input signal. The sensory input signal may be used in one or more sound field configuration algorithms supported by the media network. In one non-limiting example one or more peers may be configured to generate associated sensory inputs signals (e.g. local sound fields, etc.). The sensory input fields may be provided to a sound field assessment algorithm included in the media network to assess one or more aspects of the sound field. In aspects, the sound field assessment algorithm may be configured to assess the bass modes in a room or venue associated with the media network. The sound field assessment algorithm may be computed and/or executed via one or more peers in the media network during operation.

The media network may include algorithms for providing feedback, noise cancellation, and/or local sound field resonance cancellation within an associated media field. Such algorithms may be configured to adjust the media stream before, during, and/or after delivery to the designated rendering device(s) so as to compensate for the desired effects. In one non-limiting example one or more rendering devices may adjust an incoming audio stream, perhaps based on the local audio levels, average sound pressure level experienced at an associated observer, etc. so as to adjust the sound field locally to better match a desired playback condition (e.g. a more uniform sound pressure level, a controlled sound pressure level at a source, etc.). In one aspect the desired characteristic may be determined by comparing the desired sound pressure levels from the media stream, with those experienced by an observer in the sound field (i.e. generation of a local deviation from the desired playback conditions).

The media network may include one or more virtual sound card services. The virtual sound card service may be configured to more easily manage resources (e.g. for calculating signal conditioning aspects, resampling aspects, etc.), manage differing audio standards, sample rate allowances, etc. amongst peers on media network, and delivery of audio streams to designated rendering devices on the media network. In aspects, the media network may include one or more virtual sound card services, configured so as to interrelate peers and rendering devices within the network and so as to automatically adjust rendering devices at any given time to improve the sound field quality for a user in the sound field. In aspects, the virtual sound card service may provide a hand off of a media stream, a rendering task, a signal conditioning aspect, or the like between a personal rendering device and a high quality fixed installation, between fixed installations, etc. dependent upon the movement of an associated peer and/or user throughout the space covered by the media network.

The network may include one or more 'virtual' participants, perhaps "inserted" into the shared sound field at a predetermined physical location. The virtual participants may feed media, local sound field data, into the media network, and may interact with the network from a remote location. In one non-limiting example, a virtual participant may interact with the media network via a WAN connection. The system may prioritize synchronization within the local network with higher priority than that associated with WAN connected virtual participants. Other environmental functions such as analysis of an associated venue (e.g. environmentally influenced media artifacts, echo analysis, reverb analysis, listening point analysis, etc.), wave-field synthesis, and/or 3D sound field generation and/or analysis may be performed at least in part via one or more peers and/or virtual participants in the media network. In one non-limiting example, a virtual participant may be inserted into the sound field (i.e. as part of a wave-field synthesis application, to give the illusion of localized sound production in a sound field, to insert an orchestral member, etc.).

A virtual participant may be used to evaluate a wave-field synthesis algorithm, to adjust such an algorithm, etc. In this non-limiting example, the virtual participant may be inserted at a point within the space and configured to generate one or more rendered media stream for detection and/or monitoring by one or more peers in the network. The monitoring feedback may be used as input to an associated sound field enhancement algorithm to adjust one or more aspects thereof (i.e. timing between renderers, rendering amplitudes, superposition of sound effects, etc.).

Media networks in accordance with the present disclosure may be applicable to a wide range of applications and venues. Some non-limiting applications and/or venues for implementation of such media networks include clubs, restaurants, home, office, parties, personal media spaces, conferences, hotels, resorts, sporting events, auditoriums, large venues, outdoor venues, sound field synthesis, movie theaters, and the like.

In one non-limiting application, a media network in accordance with the present disclosure may be configured to operate within a club. The club may include one or more fixed installations, each fixed installation including one or more peers, optionally configured as rendering devices to participate in the media network. The peers may include audio devices (loudspeakers, observers, etc.), visual devices (screens, light displays, etc.), and/or sensors (proximity sensors, ambient light sensors, sound pressure level sensors, etc.). The club may include one or more mobile peers, a mobile peer being free to move throughout the club (e.g. a wireless peer configured as an observer for use by a waitress, security personnel, entertainers, etc.). The media network may accept one or more potential peers as they enter the venue, request participation, etc. promoting each potential peer into one or more groups (e.g. promotion into a customer group, a listener, an employee group, etc.). The peers participating in the media network may be assigned to one or more groups within the media network. Groups may be configured based upon spatial relationships (e.g. locations, rooms, regions of a space, proximity to one or more peers, etc.), based upon relationships with one or more peers in the network (e.g. waiting staff, security, management, entertainers, administrations, tech ops, customers, high profile customers, DJ, etc.).

The media network may include a group configured as part of a venue (e.g. a café, a shop, a shopping center, a restaurant, etc.). One or more prospective peers may be added to the group based upon proximity thereto, signup by an associated user, etc. Within the group, media streams may be played via one or more fixed rendering devices (e.g. speakers within the venue), rendering devices associated with one or more users, etc. One or more user devices may monitor the local sound field generated by one or more of the devices in order to provide spatial feedback for balancing the sound field, etc. One or more peers may interact with the selection of the media streams. Such selection may be coordinated through a form of virtual jukebox function, through a media queuing system, through associated games, promotions, or the like.

In aspects, a prospective peer may be added to the network by bringing the peer (e.g. a smartphone) into close proximity to a barcode, an ID matrix, an NFC tag, etc. (i.e. perhaps located at one or more site within the venue, tables, etc.). Peers may interact with the media network via a queue system, etc. whereby a user may vote upon media in the queue so as to vote up or down the associated media for playback, pay to play media, combinations thereof, and the like.

One or more potential peers may be added to the network by a range of avenues, such addition may be initiated locally, such as when potential peers enter a venue, pass a registration center, etc. Potential peers may be pre-designated remotely (i.e. so as to further simplify the addition process when arriving at a venue, validate attendance, etc.) through actions such as scanning event tickets, entering promotion codes, communicating with ID tags, etc.

One or more peers in the club may be designated as a rendering device, so as to render one or more media stream or aspects thereof during operation. In one non-limiting example, a loosely connected grouping of peers may support rendering of a unified media stream there between. In this example, the grouping of peers may belong to a media network in accordance with the present disclosure, the peers being configured appropriately as rendering and/or observing devices within the media network. The collective peer base may simultaneously render an associated media stream, thereby generating a much more substantial sound field than could be produced by any individual peer acting without the support of the group. Such a configuration may be advantageous for generating a loud sound field (e.g. for a party, etc.) from a collection of substantially undersized peers. The media network may include one or more synchronization services so as to add local sound field enhancement, local delay correction, etc. so as to provide a high quality sound field during use.

In one non-limiting application, a media network in accordance with the present disclosure may be configured to operate within a home, office, or small venue setting. The media network may be configured so as to easily and cost effectively establish and maintain one or more media fields within the environment (one or more rooms within a home, office, theater, church, auditorium, etc.). The media network may include spatially designated groups (e.g. zones within the environment, rooms, entryways, etc.) so as to allow for spatially based network reconfiguration during use, as peers and/or potential peers, move throughout the venue, as high priority peers move throughout the venue, etc. The media network may include relationship based groups, optionally tied to associated spatially designed groups. In one non-limiting example, a media network established within a household may include a number of peers (e.g. 5) designated as belonging to a family member group. The media network may have a plurality of spatially designated groups (e.g. zones, living room, kitchen, den, bedrooms, bathrooms, etc.). Each peer may have one or more zones within the household wherein their preferences may have higher priority versus other peers in that zone (e.g. a peer designed as "owning" a zone such as a bedroom for example). One or more peers may be designated as having priority based on seniority (e.g. a parent member, an administrator, etc.), or may have a priority that changes throughout a day (e.g. a peer may be demoted after a certain time of night for example), etc. The priorities may be configurable automatically and/or manually by one or more peers (e.g. a parent member, an administrator, etc.).

Priority within a zone may further be designed on a "first come first served" basis (e.g. such as in a bathroom or common room within the venue). In one non-limiting example, a peer may enter a spatially designated group (e.g. a washroom) and automatically take over priority for that zone. Upon transition, designated peers within the zone (such as rendering devices) may automatically transition from a standby state to streaming of the peer's designated media stream (e.g. video, audio stream, etc.).

In another non-limiting example a priority peer may move throughout spatially designated groups within the media network. As the peer moves throughout the groups, the media network may automatically reconfigure rendering devices, media streams playing on media devices, etc. to ideally render the media field around the priority peer. In one non-limiting example, a media network may include one or more spatially designated groups (e.g. a living room and a kitchen). A priority peer may be listening to an audio stream within the kitchen, on kitchen based rendering devices (e.g. loudspeakers enlisted to play the audio stream within the kitchen environment). As the priority peer moves from the kitchen to the living room, the media network localization services may recognize the intent of the priority peer and slowly transition the audio stream from rendering devices within the kitchen to rendering devices within the living room. Such a configuration may also be configured to work upon low priority peers as long as a new zone (e.g. a living room, a kitchen, etc.) being entered by the peer is not in use (i.e. identified as vacant, etc.).

The transition may be performed so as to provide the priority user with an uninterrupted transition. Such a transition may be performed through use of the priority peer resources and/or hardware (e.g. perhaps enabled with a microphone, etc.). In this sense, the priority peer may behave like an observer within the space, providing the network with feedback pertaining to the sound field experienced by the priority peer as it is moved throughout the space. In one non-limiting example, the audio stream as rendered at the associated rendering devices (in the kitchen and/or in the living room) may be automatically adjusted so as to maintain the sound field in the vicinity of the priority peer during the transition (e.g. as monitored by sensors included in the priority peer device and algorithms/services operating on the media network).

In aspects, a finer resolution of the spatial relationship between the peer and one or more rendering devices in the media network may be used to alter the sound field perceived by the peer during use. In aspects, a directionally designated media stream may be coordinated by one or more rendering devices in the vicinity of the peer. The rendering devices may render one or more portions of the stream (e.g. channels, frequency aspects, color aspects, virtual sound sources, instruments, etc.) so as to maintain the rendered stream at the desired level. Such a configuration may be advantageous for generating a controlled 3D sound field around a peer, perhaps even as a peer moves throughout the sound field.

The media network may be configured to monitor quality of service of the media delivery to one or more peers in the network. The media network may automatically adjust the rendering of a stream by one or more rendering devices in order to adjust poor quality of service concerns and/or to maintain the quality of service above an acceptable level. The media network may monitor for corruption of a media stream by other traffic on the network (e.g. another media stream, local disturbances, HVAC noises, poor rendering by a rendering device, environmental noises, wind, etc.) at one or more peers within the network. The media network may be configured to compensate for such corruption so as to improve the rendered media stream experienced at the monitoring peer. In one non-limiting example the bit-rate of a stream could be gradually reduced in order to maintain maximum allowed latency while simultaneously maintaining synchronization to within an acceptable quality level.

In one non-limiting example, a plurality of media streams (e.g. audio streams) may be designated for listening by a plurality of distinct peers (e.g. peers associated with users) on a media network in accordance with the present disclosure. A first peer may have designated that the media network deliver a first rendered stream (e.g. a first audio stream) thereto and a second peer may have designated that the media network deliver a second rendered stream (e.g. a second audio stream) thereto. The first and second rendered streams may be rendered by one or more rendering devices within the media network. The first peer may include a sensor (e.g. a microphone) to sample the local sound field as part of a quality of service algorithm included in the media network. If an aspect of the second stream is detected by the first peer (i.e. an interference), the media network may automatically adjust rendering from one or more of the rendering devices so as to reduce the interference (e.g. via changes in the rendering signals, rendering levels, via active noise cancellation, etc.).

In aspects, ae first rendered stream may be adjusted as a first peer moves throughout the venue. As the first peer moves into proximity with a second peer, a volume associated with the first rendered media stream may decrease gradually until the stream disappears. As the first peer leaves the proximity of the second peer, the first rendered media stream may be slowly re-established.

In aspects, perhaps applicable to a hospital and/or restaurant setting, as a peer in a first group (e.g. a peer in a doctor group, in a waiting staff group, etc.) moves into a spatially oriented group (e.g. a hospital room, a dinner table, etc.), the local media field previously established in the spatially oriented group may dim, pause, etc. such that interaction between the peer in the first group may interact with one or more peers in the spatially oriented group (e.g. patients, customers, etc.).

In aspects, perhaps pertaining to a restaurant and/or hospital setting, one or more peers designated as group members of a spatially oriented group (e.g. a dinner table, a hospital room, etc.) may be configured to control the local media field (e.g. audio, visual, settings, etc.), and/or environmental settings (e.g. lighting, local temperature, humidity, etc.) within the spatially oriented group. Such control may be provided via a simplified application, for example on a smartphone, a tablet computer, etc. Peers (members) in a higher priority group (e.g. waiting staff group, nursing group, doctor group, etc.) may be able to override the settings previously controlled by the group members. Messaging, direct communication, etc. between group members to higher priority group members may be designated for remote communication within the media network.

FIG. 1 shows a media network 100 in accordance with present disclosure. The media network 100 includes a general peer 110, one or more rendering devices 114a-b, an observer 116 interconnected 115a-f with one another within the network 100. FIG. 1 also shows a prospective peer 112 as it communicates with the media network 100, perhaps as part of a sign in routine, etc. Although specific numbers of peers 110, observers 116, rendering devices 114a-b, and prospective peers 112 are shown in FIG. 1, such entities may be present or not present in various quantities in an implementation of the media network 100. The media network 100 may also include a power and/or network hub 118. Such a hub 118 or any equipped peer (e.g. perhaps the general peer 110, rendering device 114a-b, observer 116, etc.) may be configured to communicate with an external participant (not explicitly shown). The general peer 110 and/or the rendering devices 114a-b may be configured to render and/or observe a media stream delivered throughout the media network 110 during operation. The media stream may originate from one or more peers 110, rendering devices 114a-b, observers 116, etc. on the network, or equivalently from an external participant (i.e. entering the network via one or more peers), and be delivered to one or more designated peers 110, rendering devices 114a-b for playback. As shown in FIG. 1, one or more of the rendering devices 114a-b, and/or peers 110 may render media associated with the media stream (e.g. audio, video, lighting, etc.). The prospective peer 112 may establish one or more interconnections 115a-b with one or more peers 110, 114a-b, etc. in the network 110. The prospective peer 112 may render a communication signal 111a as part of a configuration algorithm, network connection process, etc. One or more peers 110, 114a-b, 116, may generate communication signals 111b-d to communicate with the prospective peer 112, configure the media network, as watermarking aspects of the media stream, etc. The observer 116 may monitor the local media field 113 so as to provide a feedback signal for use within the media network 100 (e.g. for use by one or more services on the media network, etc.).

The media network 100 may include one or more services in accordance with the present disclosure. Some non-limiting examples of services include synchronization services, media delivery services, sound field generation services, sound enhancement services, resource management services, data delivery services, virtual sound card services, quality services, configuration services, spatialization/localization services, watermarking services, environmental control services, combinations thereof, and the like each in accordance with the present disclosure. The media network 100 may include one or more support services including identification functionality services, network data flow controls, resource management services, resolution reservation services, quality of service monitoring, etc. as known to one skilled in the art.

One or more of the peers 110, rendering devices 114a-b, observers 116 may be a fixed device, such as part of a home theater system, a television set, a large appliance, etc. Additionally, alternatively, or in combination, one or more of the peers 110, rendering devices 114a-b, observers 116, may be a mobile device, such a smartphone, a tablet computer, a remote control, a wireless media center, a mobile speaker system, etc.

The interconnections 115a-f may be wireless, wired, etc. The interconnections may change and adapt based on the configuration of the network and/or peers 110, 114a-b, 116 on the network. The interconnections 115a-f may conform to the overall network 100 topology (i.e. particular to the particular implementation thereof).

The media stream may originate from within the media network 100 or from an external participant (i.e. entering the network 100 through one or more of the peers). The network 100 may support simultaneous rendering of a plurality of streams, with particular rendering devices 114a-b and/or peers 110 designated for each or a combination of the streams.

The network 100 may establish one or more local media fields 113 (shown in this case as an audio field, but equivalently could be any media). Rendering of the media fields 113 may be competitive based on changing priorities on the network, proximity of one or more peers 110, 114a-b on the network, etc.

The power and/or network hub 118 may be configured to interconnect the media network 100 with one or more additional networks (e.g. a WAN, smart energy network, Actiline power, and signal distribution network, home appliance network, etc.). Such interconnection may be provided such that the media network and/or one or more peers thereupon may control one or more associated appliances, environmental parameters, etc. during operation.

Figure 2:
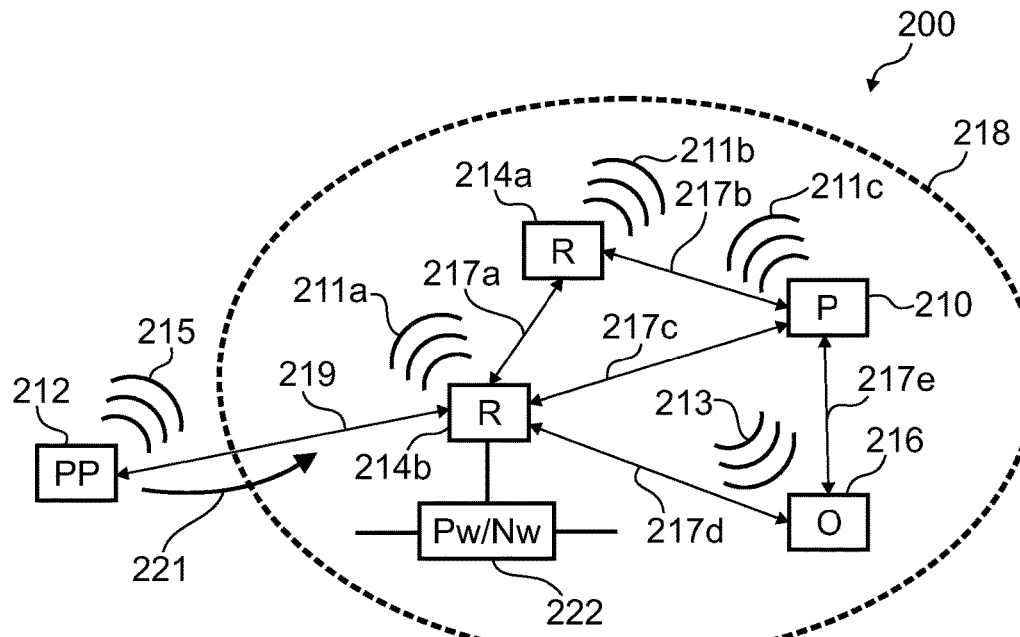
FIG. 2 shows aspects of a media network in accordance with the present disclosure including a group.

FIG. 2 shows aspects of a media network 200 in accordance with the present disclosure including a group 218. The group 218 may be designated to assign priorities, relationships (e.g. such proximity, social similarities, etc.) between peers that are members of the group 218. The group 218 includes a general peer 210, two rendering devices 214a-b (i.e. peers that have been configured specifically as rendering devices), an observer 216, and a power/network hub 222. The members of the group 218 are interconnected 217a-e so as to communicate data, media, etc. between each other during operation of the media network 200. The members of the group 218 may also render a media stream 211a-c and/or listen to a rendered media field 213 during operation of the media network 200. FIG. 2 also shows a prospective peer 212 in the process of establishing communication with the media network 200 (e.g. via one or more members of the group 218). The prospective peer 212, or the media network 200 may establish a temporary connection 219 there between in order to communicate during an initiation process, query and/or automated introduction process between the prospective peer 212 and the media network 200. The temporary connection 219 may be initiated based on a spatial relationship between the prospective peer 212 and the network 200 perhaps due to movement 221 of the prospective peer 212 into the spatial zone of the group 218. The temporary connection 219 may also be established due to a query, an acceptance, a scan, a user request, etc.

In aspects, the credentials for access of a prospective peer into the media network, a group within the media network, or the like may be established via communication of a watermark in the sound-field, pulsed LED-lighting within a group/zone, via RFID communication, NFC communication, social network membership identification (e.g. on Facebook, LinkedIn), combinations thereof, or the like.

The prospective peer 212, one or more peers 210, rendering devices 214a-b, may communicate along the rendering path 211a-c, 215 (e.g. audio, visual media, light modulator, ultrasonic communication, etc.) so as to configure the network, establish communication, identify a member, establish proximity between one or more members, etc.

Figure 3:
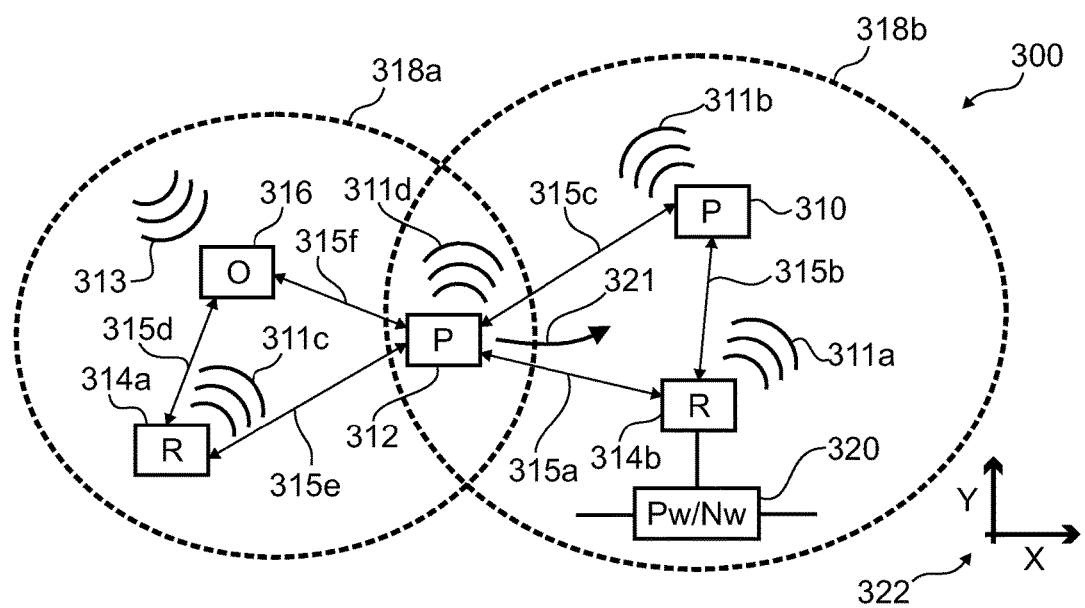
FIG. 3 shows aspects of a media network in accordance with the present disclosure including multiple groups.

FIG. 3 shows aspects of a media network 300 in accordance with the present disclosure including multiple groups 318a-b. The media network 300 includes a first group 318a and a second group 318b. The first group 318a includes a rendering device 314a, an observer 316 and a transitioning peer 312 interconnected 315d-f for the purposes of rendering media there amongst. The transitioning peer 312 may be configured to render one or more aspects of a media stream to form a rendered media stream 311d, the rendering device 314a may be configured to render one or more aspects of the media stream to form a second locally rendered media stream 311c, and the observer 316 may be configured to monitor the local media field 313 at a site within the media network 300 perhaps to generate a feedback signal, adjust rendering by the rendering device 314a and/or the transitioning peer 312, group members from the second group 318b, etc.

The second group 318b includes a rendering device 314b, a peer 310 and a power/network hub 320 interconnected 315b for distributing one or more media streams, data, etc. there between. One or more members of the second group 318b may be interconnected with the transitioning peer 312. The peer 310 may be configured to render one or more aspects of a second media stream to form a second rendered media stream 311b and the rendering device 314b may be configured to render one or more aspects of the second media stream to form another second locally rendered media stream 311a. The power and/or network hub 320 may be configured to interconnect the media network 300 with one or more additional networks (e.g. a WAN, smart energy network, home appliance network, etc.).

The transitioning peer 312, one or more members of the first group 318a, and/or one or more members of the second group 318b may be configured to establish interconnections 315a, 315c there between so as to guide the transition of the transitioning peer 312 from the first group 318a to the second group 318b. The transition of the transitioning peer 312 may occur due to movement 321 of the transitioning peer 312 into a zone associated with the second group 318b, departure from a zone associated with the first group 318a, due to a user selection, a change in priority settings for the transitioning peer 312, or the like.

In aspects, one or more of the groups 318a-b may have a zone with physical dimensions as determined in a reference space 322. The physically embodied group 318a-b may be a room, a zone, a region within a venue, etc. The media network 300 may include one or more localization services so as to determine where members of the network reside within the physical dimensions of a group 318a-b or the media network 300 on the whole. As a transitioning peer 312 passes from the first group 318a to the second group 318b (as determined by one or more of the localization services), an implied transition between the groups 318a-b may be initiated by the media network 300 or a member thereof.

Figure 4:
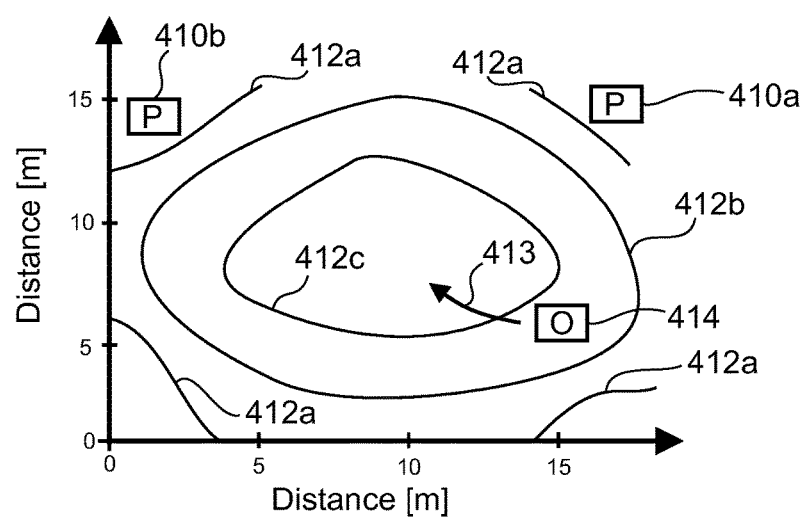
FIG. 4 shows aspects of a media network in accordance with the present disclosure to generate a local sound field.

FIG. 4 shows aspects of a media network in accordance with the present disclosure to generate a local sound field from a media stream. The local sound field is represented as a contour plot with several contour lines 412a-c representing the equipotential lines of the sound pressure levels throughout the field at an instant in time. The media network includes a plurality of peers 410a-b and an observer 414. The observer 414 is shown moving throughout the sound field generated by one or more of the peers 410a-b. The observer 414 may be configured to monitor (e.g. via one or more sensors) the local sound field. One or more aspects of the local sound field as monitored by the observer 414 may be used as feedback signal to the media network for a variety of purposes in accordance with the present disclosure.

In aspects, the feedback signal may be used by one or more network services to assist with localization of one or more peers in the media network, to adjust one or more signals related to the media stream delivered to the peers 410a-b, adjust the signal processing algorithms on one or more of the peers 410a-b, and/or to adjust one or more of the rendering parameters on one or more of the peers 410a-b.

The feedback signal may be generated from one or more aspects of the sound field such as from a local sound pressure level, phase variation between one or more feedback signals, echo correlations, reverb levels at the location of the observer, averages, constructs and/or variations thereof. The feedback signal may be adjusted by a psychoacoustic algorithm, one or more rendering properties of one or more of the peers, a venue (e.g. room, auditorium, etc.) acoustic effect, or the like to adjust for one or more properties of a listener located in the sound field.

The observer may be equipped with a means for determining the direction of a sound wave, quirk or impulse in the rendered media stream local to the observer. The direction of the sound wave may be used to help localize one or more peers in the process of rendering the media stream, etc. Some non-limiting examples of means for determining the direction of propagation of a sound wave arriving at the observer include simultaneous monitoring of two or more microphones (i.e with substantially determined proximal relationships to each other, etc.), directional microphones, pre-determination through known localization parameters, combinations of thereof, etc.

Figure 5:
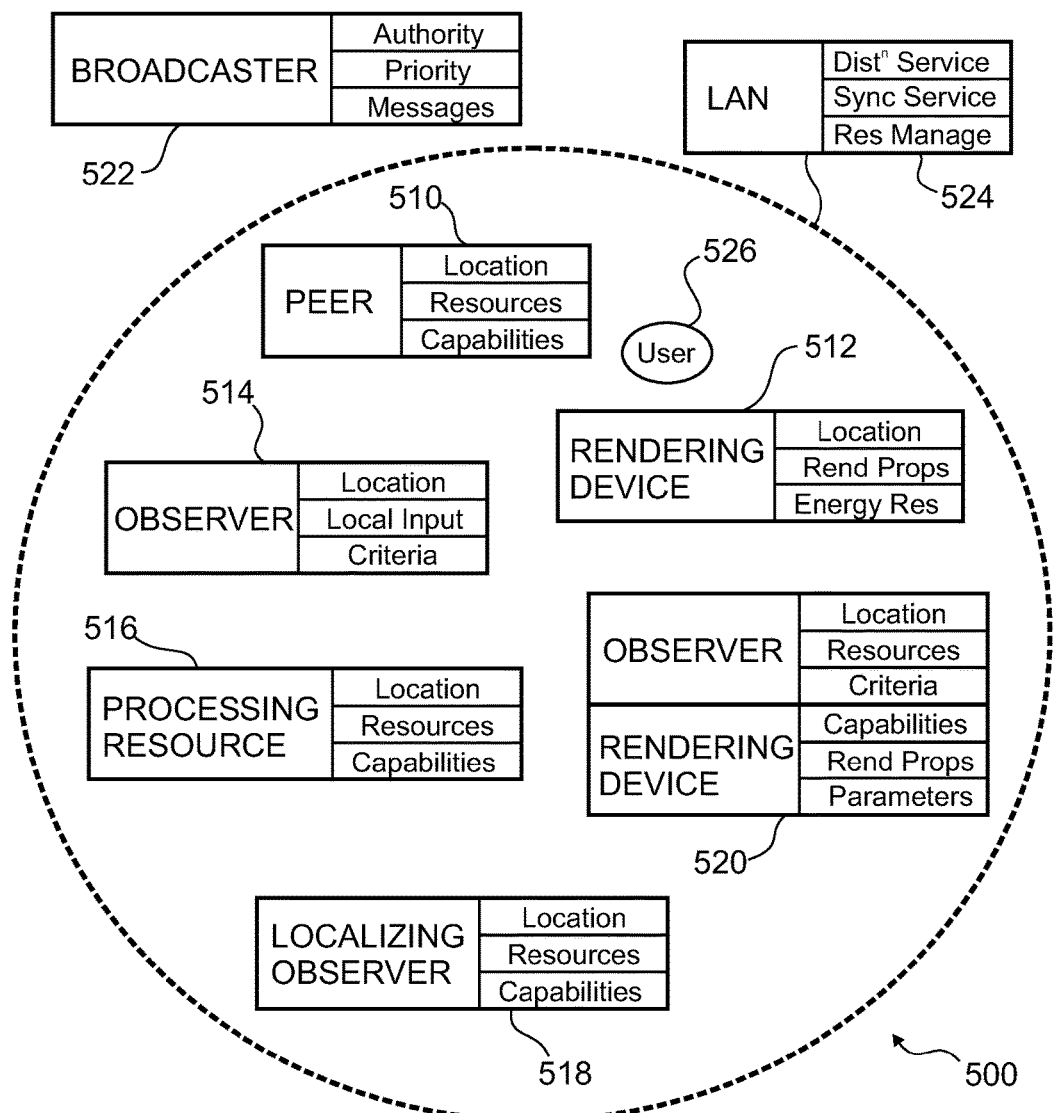
FIG. 5 shows aspects of a media network in accordance with the present disclosure.

FIG. 5 shows another media network 500 in accordance with the present disclosure. The media network 500 is configured upon a local area network (LAN) 524 and includes a plurality of members (e.g. peers). As shown in FIG. 5, the members may be designated in various forms, so as to enable particular functions within the media network 500. In general, a member of the media network may be a peer 510. The peer 510 may be configured to perform one of many tasks within the media network 500. One or more peers 510 may be designated, elected and/or suggested for a particular designation. The media network 500 may include peers that have been designated to perform a particular function or collection of functions within the media network 500. The media network 500 may include one or more peers, each peer configured as a general peer 510, as a rendering device 512, an observer 514, a processing resource 516, a multifunctional peer 520, a localizing observer 518, a user 526 (e.g. a human, perhaps tied to a peer, perhaps alone, etc.), or the like. The media network 500 may include and/or communicate with one or more broadcasters 522 (e.g. perhaps located remotely from the LAN 524).

The media network 500 may include one or more services in accordance with the present disclosure, configured for execution throughout the LAN 524, or optionally for execution on designated members within the network 500. The LAN 524 may include one or more of the services. As shown in FIG. 5, the LAN 524 includes a media distribution service, a synchronization service, and a resource management service, each in accordance with the present disclosure. The LAN 524 may include other services such as localization services, media enhancement services, network configuration services, each in accordance with the present disclosure.

One or more peers 510 may include various parameters, services, capabilities, resource levels, operational settings, or the like for use in rendering a media stream, managing and/or influencing the media network, etc. Some parameters may include a location (perhaps changing over time), an altitude, a zenith angle, a heading, a velocity, acceleration, one or more rendering parameters, an energy reserve, or the like. Some capabilities may include sensory capability, user input capability, a display, rendering capability (e.g. one or more loudspeakers, one or more displays, indicators, etc.), localization capabilities, computational capabilities, media analysis hardware, and the like. One or more peers 510 may include a multitude of capabilities, thus potentially being able to be designated for performing a range of tasks within the network 500.

One or more peers may be configured as a rendering device 512 in accordance with the present disclosure. The rendering device 512 may be configured to render input media streams, include a range of rendering properties, a location (perhaps changing over time), one or more energy reservoirs, configuration parameters, computational resources, digital media rendering processes, and the like. The rendering device 512 may be designated for receiving a portion of a media stream or a signal derived from the media stream during operation. The media network 500, a user 526, a broadcaster 522, or the like may designate the rendering device 512 for playback of one or more aspects of the stream.

One or more peers may be configured as an observer 514 in accordance with the present disclosure. The observer 514 may be configured to monitor the media field generated by the media network 500 at a physical location within the network. An observer 514 may be in the presence of and/or attached to a user 526. The observer 526 may include one or more sensors (i.e. for sampling from the local media field, etc.), processing resources, configuration parameters, field assessment criteria, assessment algorithms, a physical location, field correction algorithms, means for localizing the observer 514, one or more users 526, and/or one or more members of the media network 500, or the like. The observer 514 may be used to assess the quality of service of the media streaming aspects of the media network 500.

The media network 500 may include a media source (not explicitly shown). The media source may be a peer 510, a broadcaster 522, etc. The media source may come from an external participant (e.g. a streaming service, a cloud based storage system, etc.), may originate from within the media network (e.g. generated by a peer 510, a broadcaster 522, etc.), enter the media network via a WAN connection, a cellular network connection, etc.

One or more broadcasters 522 may be configured to generate a multicast media stream into the media network 500. The broadcaster 522 may be configured with a priority level, an authority level, etc. so as to direct the resulting media stream to one or more peers/observers throughout the media network 500. The broadcaster 522 may communicate with other members through messaging aspects (e.g. via notification queues, text messaging, text streams, etc.) in addition to media networks 500.

One or more of the localizing observers 518 may be configured to determine one or more locations of one or more peers within the media network 500. A localizing observer 518 may include a visualization device (e.g. a camera, a photodetector, an audio localization scheme, a thermal motion capture system, an ultrasonic range finder, a visual, near infrared, and/or infrared based range finder, etc.). The localizing observer 518 may include available computational resources, a listing of capabilities, etc. that may be presented to the media network 500 for use in a configuration service, etc.

One or more multi-functional peers 520 may be specifically designated within the media network 500 to perform a plurality of tasks, such as rendering, observing, providing a user interface, etc. Multi-functional peers 520 may include aspects suitable for performing the intended function (e.g. rendering, observing, etc.) in accordance with the present disclosure.

FIG. 6 shows another media network in accordance with the present disclosure including a localizing observer 614. The media network includes a plurality of peers 610a-c configured to render and/or observer a media stream to produce local rendered streams 613a-c. The media network may include an observer 612 configured to sample the local media field at least partially generated by one or more of the peers 610a-c. The media network includes a localized observer 614 configured to determine one or more spatial relationships (e.g. a location, a movement rate, a reference angle between, a relationship between, etc.) relating to one or more peers 610a-c, the observer 612, perhaps features in the vicinity of the media field. The localizing observer 614 may include a visualization system (e.g. a camera, a stereoscopic camera, a 3D camera, a thermal imaging camera, a Kinect system, a motion sensing input, a thermopile, an ultrasonic range finder, or a combination thereof, or the like) optionally with a field of view 615. The localizing observer 614 may be configured to monitor one or more members (e.g. peers 610a-c, observers 612, etc.) during operation so as to determine the physical relationship between them. Such information may be made available to the media network for processing (e.g. such as by a service on the network, for a computational process on a peer 610a-c, etc.).

One or more visualization systems in accordance with the present disclosure may be included into or interact with an associated media network. The visualization system may provide localization data to the media network for use in tracking the location of one or more peers, one or more human users, etc. The visualization system may provide visual references between the human users and the media rendering devices, so as to assist with adjusting the sound field accordingly (e.g. adjusting which rendering devices will play aspects of the media field, etc.).

The media network may include a plurality of input devices, each input device configured to collect localization and/or media field related information from within the media network during operation. In the non-limiting example shown in FIG. 6, the observer 612 and the localizing observer 614 may collect multiple input streams from the local environment, media field, etc. The network services and/or associated sensor fusion algorithms may be used to implement such data to adjust the local media field, adjust one or more environmental settings, generate one or more alerts, etc. each in accordance with the present disclosure.

The media network may include a prioritization scheme in accordance with the present disclosure. In aspects, the data prioritization scheme may prioritize the following, in decreasing order of priority: synchronized streams, non-synchronized streams, feedback from observers, localization parameters, environmental/home automation control signals, generic communication of data packets (e.g. credentials, settings, etc.). The prioritization of media streams may depend upon such factors as peer to peer proximity, media stream cross talk, the compression approach attached to the media stream, and the like. In aspects, a quality of service algorithm in accordance with the present disclosure may exclude a peer from a list of priority rendering devices if the peer cannot adequately meet the performance requirements (e.g. sound quality, minimum latency requirements, etc.) associated with the network.

FIGS. 7a-b show aspects of methods for establishing connections to and rendering media on a media network in accordance with the present disclosure. FIG. 7a shows a method for connecting and establishing network communication between one or more peers on a media network in accordance with the present disclosure. The method includes establishing connections to one or more peers, optionally announcing one or more capabilities of each newly connected peer to the media network, designating functions amongst one or more of the peers, starting and/or modifying one or more services on the media network, configuring resource management amongst one or more of the peers, optionally coordinating analysis functions amongst the peers, optionally establishing, modifying, and/or configuring traffic direction over the media network, distributing a media stream over the media network, optionally observing a media field rendered by one or more members of the network, and optionally compensating and/or adjusting the media stream, one or more functional aspect of one or more peers, and/or one or more rendering parameter of one or more peers.

The method may include reconfiguring one or more rendering properties on one or more peers on the media network, perhaps to improve and/or adjust the media field during playback of the media stream.

FIG. 7b shows a method for rendering a media stream on a media network in accordance with the present disclosure. The method includes connecting together one or more peers on a media network in accordance with the present disclosure, designating one or more peers as rendering devices for a media stream, rendering one or more aspects of the media stream on one or more of the rendering devices to produce a rendered media field, optionally observing the rendered media field, and compensating, adjusting, and/or reconfiguring one or more aspects of the media network based upon the observation.

Figure 8A:
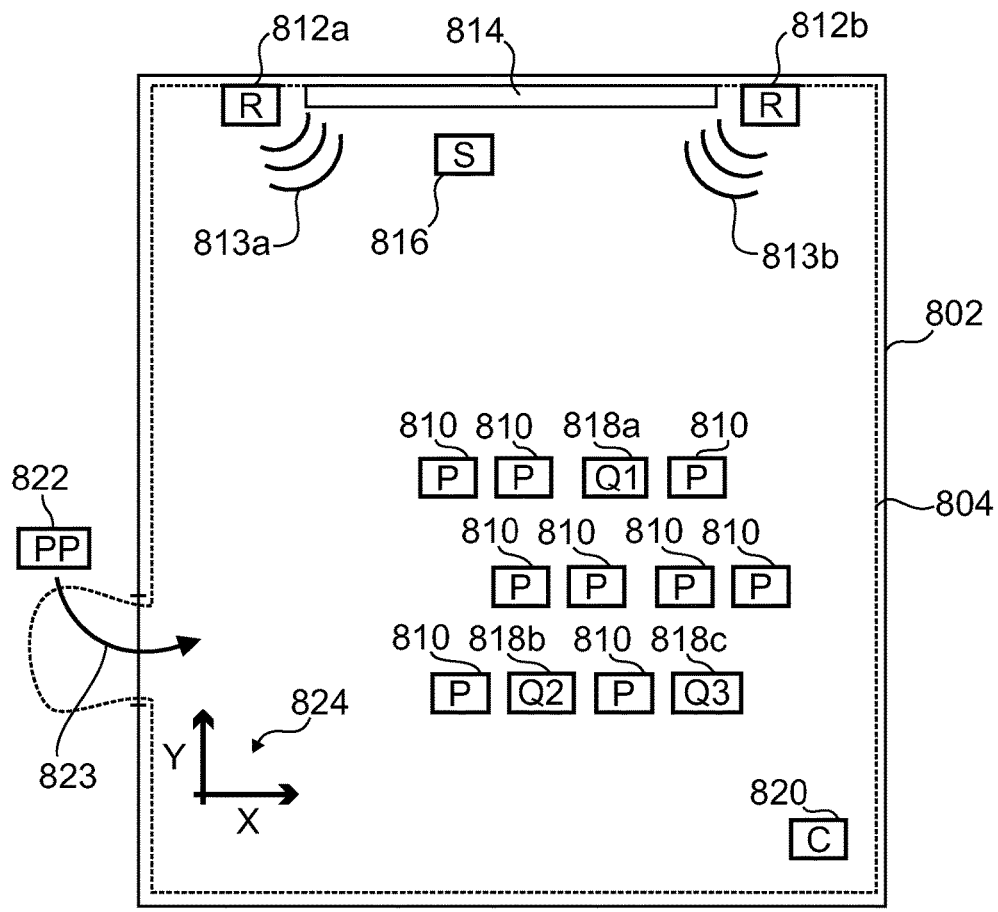
FIGS. 8a-b show aspects of a media network in accordance with the present disclosure configured for a meeting session.
Figure 8B:
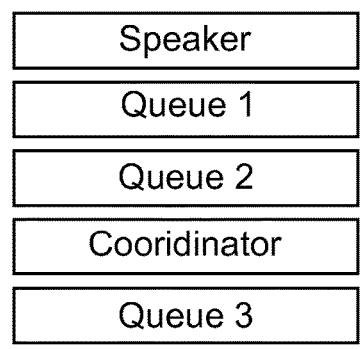

FIGS. 8a-b show aspects of a media network in accordance with the present disclosure configured for a meeting session (e.g. a conference, a networking event, a meet up, a lecture, a theater, etc.). FIG. 8a shows a room 802 and a group 804 included in a media network in accordance with the present disclosure. The room 802 may be used as part of a meeting session or the like. The group 804 as shown is associated with room 802 and includes a plurality of members (e.g. peers, configured peers, etc.) positioned 824 throughout the group space (i.e. throughout the room 802). The group 804 includes one or more peers 810 optionally configured as one or more observers (e.g. so as to observe a media field within the group space), one or more input devices (e.g. so as to receive one or more user inputs into the media network), rendering devices (e.g. an ear piece, a loudspeaker, a display, an indicator, etc. for rendering one or more aspects of a media stream within the group or data associated there with), computational resources, etc. The group 804 includes a source 816 (e.g. a speaker), one or more rendering devices (812a-b) configured to render one or more media streams within the network to produce local rendered media fields 813a-b, each of which contributes to a resulting media field within the room.

The room 802 may include a rendering device 814 (e.g. a screen, a projector, stereo projector, etc.). One or more of the peers 810 may include a display, optionally for rendering the same media stream as the rendering device 814. The group 804 may include a messaging and/or queue based priority service (i.e. as part of the media network services) for managing messages between peers and/or the source 816 during a meeting session. The group 804 includes one or more queued peers 818a-c, included in a priority based queue (e.g. so as to ask questions, participate in a discussion, etc.). One or more peers may include software, a portal, etc. by which a queue may be established during a meeting session.

The group 804 may include a coordinator 820, optionally an administrator, a high priority peer, etc. The coordinator 820 may be programmed to configure the network, manage queue requests, designate rendering devices, monitor the quality of service on the media network, etc. so as to control the flow of the meeting session.

The group 804 may accept one or more prospective peers 822 in accordance with the present disclosure. The prospective peer 822 may join the group 804 based upon movement 823 of the prospective peer 822 into the room 802, swiping of an NFC chip by the prospective peer 822, execution of an agreement, access to a website, etc.

FIG. 8b shows a prioritized queue for use by a media network in accordance with the present disclosure during a meeting session. In the non-limiting example, shown, the source 816 (speaker) has priority and may generate a media stream for the group 804, the queue also includes (in order) a first queued peer 818a, a second queued peer 818b, a coordinator 820, and a third queued peer 818c. The queue may designate a speaking order for the queued members, an order of speakers at the conference, etc.

Figure 9A:
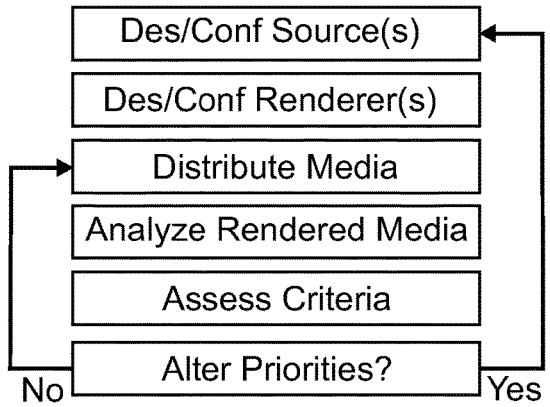
FIGS. 9a-d show aspects of methods for managing a media network in accordance with the present disclosure.

FIGS. 9a-d show methods for managing a media network in accordance with the present disclosure. FIG. 9a shows a method for managing priorities on the media network. The method includes designating and/or configuring one or more sources within the media network (i.e. sources of media streams), designating and/or configuring one or more rendering devices within the media network (i.e. devices for rendering one or more media streams), distributing media within the network, analyzing one or more aspects of the rendered media field (i.e. the media field as generated by one or more of the rendering devices), assessing criteria relating to the quality of service (i.e. thresholds for acceptable sound quality, media reproduction quality, sound pressure level, phase variations, delay, synchronization, reverberation, noise levels, etc.), and optionally altering one or more network priorities based upon the criteria. The step of altering may be used to designate and/or reconfigure one or more sources, rendering devices and/or general peers on the network, etc.

Figure 9B:
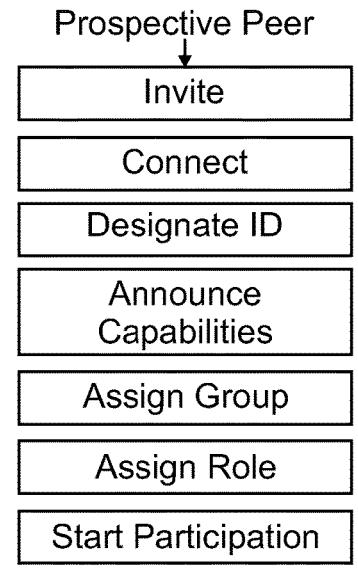

FIG. 9b shows aspects of a method for enlisting a prospective peer into a media network, a group, and/or subgroup included in the media network in accordance with the present disclosure. The method includes inviting and/or initiating the enlistment process, connecting between the prospective peer and the media network and/or one or more peers within the network, designating an identification number for the prospective peer on the network, announcing the capabilities of the prospective peer to the media network, assigning the prospective peer to one or more groups (e.g. space based groups, social groups, etc.), assigning a role and/or function for the prospective peer in the media network, and starting participation of the prospective peer in the media network (e.g. promoting the prospective peer to peer).

Figure 9C:
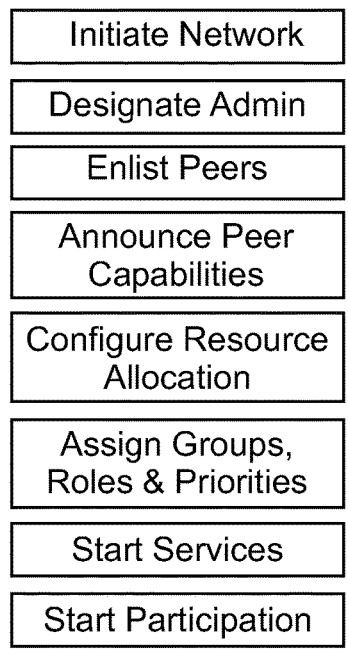

FIG. 9c shows a method for forming a media network in accordance with the present disclosure. The method includes initiating the media network, designating a network administrator (e.g. automatically, semi-automatically, manually, with user input, etc.), enlisting one or more peers to participate in the media network, announcing the capabilities of one or more peers, allocating and/or configuring resources for the media network, assigning groups, roles, and/or priorities to one or more enlisted peers, starting one or more network services in accordance with the present disclosure and/or initiating peer participation on the network. The method may include the steps of assigning one or more sub-administrators within a group, each sub-administrator configured to manage a service, a configuration aspect, delivery of a media stream, etc.

Figure 9D:
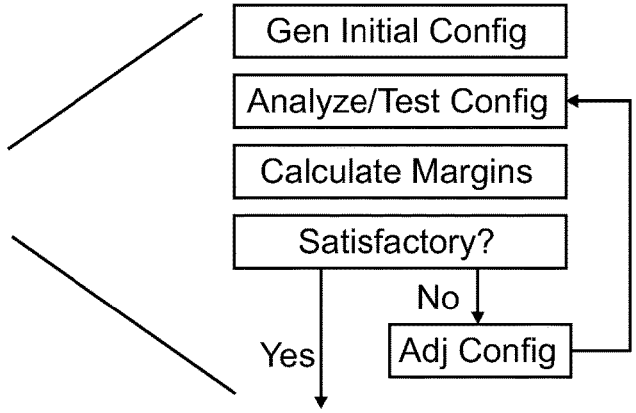

FIG. 9d shows a more detailed view of the method of allocating and/or configuring resources for the media network. The method includes generating an initial configuration, analyzing and/or testing the configuration, calculating one or more performance metrics and/or margins, deciding if the configuration is satisfactory to support the intended streaming of media over the network, if not, adjusting the configuration, if yes, continuing with the network formation process.

Figure 10:
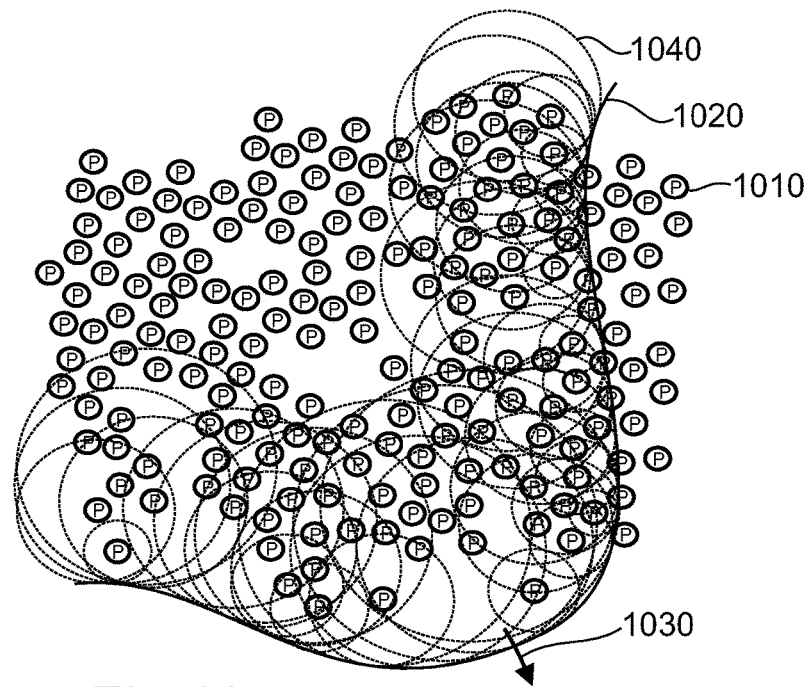
FIG. 10 shows aspects of a media network in accordance with the present disclosure configured for use in a large venue setting.

FIG. 10 shows aspects of a media network in accordance with the present disclosure configured for use in a large venue setting. The media network includes a plurality of peers 1010 amassed over a physical region. The peers 1010 may be configured as observers, rendering devices, sources, combinations thereof, or the like, each in accordance with the present disclosure. Collectively, the peers 1010 may generate a sound field, in this case a wave field 1020 with a propagation direction 1030, optionally configured so as to match a predetermined and/or a preferred configuration (e.g. determination of a 3D sound field temporally over time, thus accounting for the desired propagation characteristics of the sound field over region including the peers 1010, accounting for one or more moving sources within the sound field, etc.). The peers 1010 may be automatically enlisted to render at least a portion of a media stream associated with the wave field 1020 thus forming enlisted peers 1040 (optionally, temporarily enlisted peers, etc.). In one non-limiting example, a stream associated with a sound field may initially originate from a single peer in the network (i.e. an originating peer). As the sound field propagates from that originating peer, additional peers may be automatically enlisted to repeat the stream. Such a configuration may be used to enhance the far field reproduction of the stream amongst a collection of peers, over a large venue, etc.

Figure 11A:
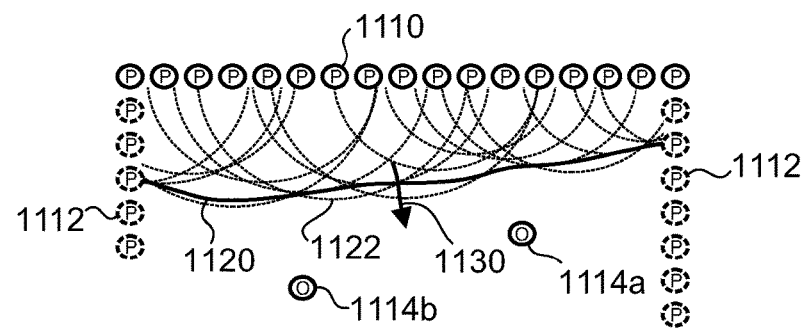
FIGS. 11a-b show aspects of wave field synthesis and/or correction with a media network in accordance with the present disclosure.
Figure 11B:
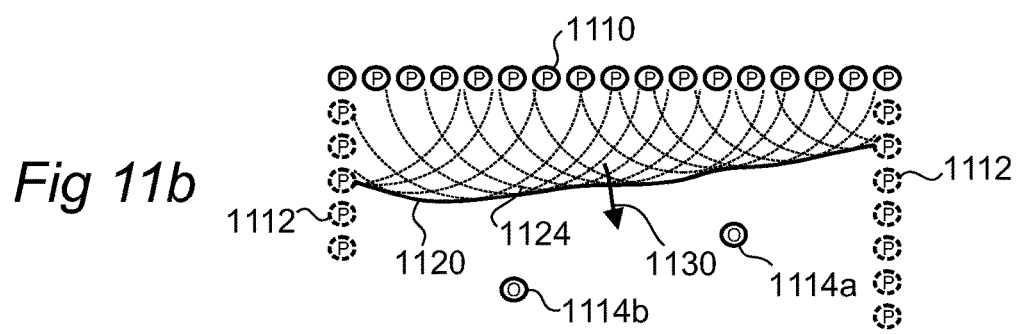

FIGS. 11a-b show wave field synthesis and/or correction with a media network in accordance with the present disclosure. FIG. 11a shows an array of peers 1110 equipped so as to render a sound field within an environment. The peers 1110 may operate collectively to generate the sound field, preferably mimicking a desired wave field 1120 to within a predetermined quality (e.g. to within a timing preference, a wave direction preference, etc.). The desired wave field 1120 may have a preferred propagation direction 1130 (i.e. at any point thereupon). The peers 1110 may accept a portion of a media stream or a signal generated therefrom within the media network. Each peer 1110 may play one or more aspects of the media stream or signal generated therefrom to form a locally rendered stream 1122 (i.e. a signal originating from at least one peer 1110 in the media network). The media network may include one or more peers configured as observers 1114a-b. The observers 1114a-b may listen locally to the sound field so as to provide quality of service input, sound field feedback, optimize timing adjustment, parameter modification, feed a timing algorithm, etc. The ideal timing and/or sound field parameters (e.g. local sound pressure level, phase, equalized audio distribution, etc.) designated for each peer 1110 may depend upon placement of the peers within the local sound field, rendering characteristics of the peers, network latency, etc. Due to errors in the above parameters, collectively the generated wave field will deviate from the desired wave field 1120. This can be seen in FIG. 11a based on the poor match between individually rendered wave forms and the desired wave field 1120. Such errors may be disadvantageous for determining the localization of a sound source with a plurality of peers 1110, reduce the quality of audio determined by one or more of the observers 1114a-b, etc. The media network may include additional peers 1112, perhaps located throughout the sound field. Additional peers 1112 may be used to listen to the local sound field (i.e. so as to adjust the overall wave field formed by the peers 1110), may be configured so as to render additional local rendered streams, etc.

FIG. 11b shows the media network as described in FIG. 11a including a wave field adjustment algorithm. The wave field adjustment algorithm may accept one or more feedback signals from one or more observers 1114a-b, one or more peers 1110, and/or one or more additional peers 1112. The wave field adjustment algorithm may be configured to accept one or more of the feedback signals and to adjust one or more of the timing parameters, rendering parameters, compensate for a room acoustic parameter, etc. of one or more of the peers 1110 in order to correct the local wave field (i.e. so as to approach the desired wave field 1120).

Each peer 1110 may include a wireless beacon, an audio watermarking algorithm, etc. so as to further assist with the field adjustment algorithm.

In aspects, the wave field adjustment algorithm may monitor the feedback signals obtained by one or more network members (i.e. observers 1114a-b, peers 1110, additional peers 1112), over a period of time (a test period). The wave field adjustment algorithm may accept one or more data sets from an associated localization algorithm in accordance with the present disclosure over the same period of time. The wave field adjustment algorithm may extract individual timing errors associated with one or more of the peers 1110. Such timing errors may be adjusted for in an associated quality of service, media streaming service, or the like included in the media network. The wave field adjustment algorithm may continue to listen to the feedback signals, perhaps in real-time or pseudo real-time so as to continually assess if the timing errors need further adjustment. Such ongoing assessment may be advantageous to adjust for changing timing errors (perhaps associated with changing network configurations, changing resource load within the network, etc.) so as to maintain a high quality rendered sound field at the desired observers 1114a-b within the media network.

Figure 12A:
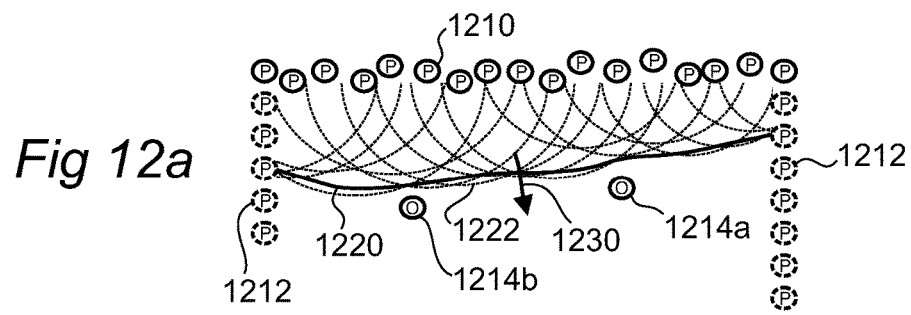
FIGS. 12a-b show aspects of wave field synthesis and/or correction with a media network in accordance with the present disclosure.
Figure 12B:
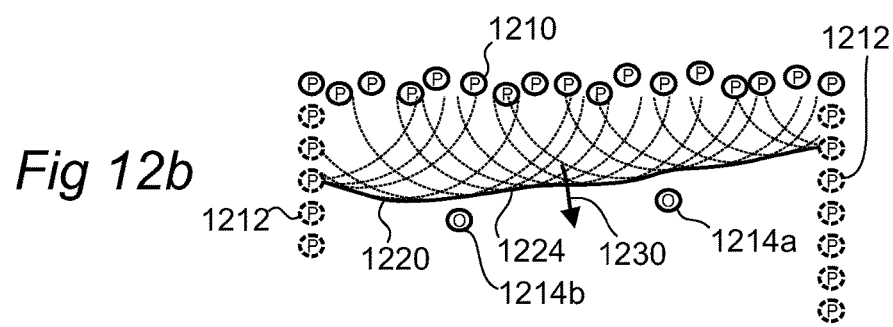

FIGS. 12a-b show wave field synthesis and/or correction with a media network in accordance with the present disclosure. FIG. 12a shows an array of peers 1210 equipped so as to render a sound field within an environment. The peers 1210 may be physically positioned throughout the space, optionally with positioning error (i.e. perhaps due to improper and/or ad hoc placement, etc.) of the peers 1210 within the space. The peers 1210 may operate collectively to generate the sound field, preferably mimicking a desired wave field 1220 to within a predetermined quality (e.g. to within a timing preference, a wave direction preference, etc.). The desired wave field 1220 may have a preferred propagation direction 1230 (i.e. at any point thereupon). The peers 1210 may accept a portion of a media stream or a signal generated therefrom within the media network. Each peer 1210 may play one or more aspects of the media stream or signal generated therefrom to form a locally rendered stream 1222 (i.e. a signal originating from at least one peer 1210 in the media network). The media network may include one or more peers configured as observers 1214a-b. The observers 1214a-b may listen locally to the sound field so as to provide quality of service input, sound field feedback, optimize timing adjustment, parameter modification, feed a timing algorithm, etc. The ideal timing and/or sound field parameters (e.g. local sound pressure level, phase, equalized audio distribution, etc.) designated for each peer 1210 may depend upon placement of the peers within the local sound field, positional errors with respect to a desired configuration, rendering characteristics of the peers, network latency, etc. Due to errors in the above parameters, collectively the generated wave field will deviate from the desired wave field 1220. This can be seen in FIG. 12a based on the poor match between individually rendered wave forms and the desired wave field 1220. Such errors may be disadvantageous for determining the localization of a sound source with a plurality of peers 1210, reduce the quality of audio determined by one or more of the observers 1214a-b, etc. The media network may include additional peers 1212, perhaps located throughout the sound field. Additional peers 1212 may be used to listen to the local sound field (i.e. so as to adjust the overall wave field formed by the peers 1210), may be configured so as to render additional local rendered streams, etc.

FIG. 12b shows the media network as described in FIG. 12a including a wave field adjustment algorithm in accordance with the present disclosure. The wave field adjustment algorithm may accept one or more feedback signals from one or more observers 1214a-b, one or more peers 1210, and/or one or more additional peers 1212. The wave field adjustment algorithm may be configured to accept one or more of the feedback signals and to adjust one or more of the timing parameters, rendering parameters, etc. of one or more of the peers 1210 in order to correct the local wave field (i.e. so as to approach the desired wave field 1220).

The wave field adjustment algorithm may include one or more functions for calculating a "best fit" given the real-time configuration and observations of the resulting media field by one or more of the peers in the media network. The analysis may be achieved by a distributed algorithm applied throughout the media network. Localization information derived from one or more localization aspects of the media network may be used to simplify the wave field adjustment algorithm.

In aspects, a distribution of peers within and at least partially generating a media field may be configured so as to produce a phonogram at one or more sites within the media field (i.e. at one or more target locations). Such information may be used to give the illusion of distributed sound sources for a user situation at the target location within the space.

In aspects, a multi-source orchestra, for example, may be simulated for a target space, specific sound sources may appear for the listener as emulating from particular locations within the surrounding media field. Such a configuration may be established amongst a collection of rendering devices, perhaps even moving through the media field (e.g. from a collection of mobile peers, etc.). Audio dither effects may be added to one or more rendered streams so as to more finely define the spatial aspects of the illusion. Such a configuration may include an associated file format, perhaps including multiple sound streams each associated with one or more sound sources, and a map for distribution of the sound sources around a target space.

Each peer 1210 may include a wireless beacon, an audio watermarking algorithm, etc. so as to further assist with the physical peer localization and/or the field adjustment algorithm.

In one non-limiting example, the media network may establish a test media stream intended for configuring the timing parameters, media streaming services, etc. associated with the media network. The test media stream may include a series of chirps, sweeps, range tests, audio passages, etc. suitable for determining one or more aspects of one or more peers 1210 in the media network. The resulting information can be used by a field adjustment algorithm and/or network configuration service in order to configure and/or determine the layout and/or properties of constituents in the network for substantially optimized playback therefrom.

In one non-limiting example, the test media stream may be directed towards a plurality of peers physically located within the media network. Series of pulses may be added to the rendered streams from one or more rendering devices in the media network and monitored by one or more observers nearby. The timing delays associated with the generation of the pulses may be used to triangulate one or more of the rendering devices with respect to the observers. Such a configuration may be advantageous for configuring a high fidelity sound system without the need for advanced audio hardware (may be configured via intuitive use of smartphone or tablet based peers).

A media network in accordance with the present disclosure may be configured so as to synthesize a wave-field within the space defined by the media network. The wave-field may be generated by one or more methods: elementary wave assembly (e.g. via Huygen's principle), via calculation of associated Kirchhoff-Helmholtz integrals, model based approaches, data based approaches (test signal based approaches), reduced aliasing methods know in the art. Such methods may be extended to include venue related factors (such as based on room geometry, wall reflection factors, etc.). The method may include correction of peer positioning within the resulting sound field via one or more associated spatialization/localization algorithms in accordance with the present disclosure.

The media network may be configured so as to capture a sound field within a venue (i.e. from a live event, within a particular location, etc.) for later reconstruction and redistribution. In one non-limiting example, a plurality of peers (e.g. smartphones, microphones, etc.), each spatially located within the venue may capture an associated media stream during the live event. The resulting sound field may be recreated through amalgamation of the collective recordings from the peers. In aspects, the resulting sound field may be recoded for playback on a personal rendering device (e.g. a headset), such that a user may experience the event from the perspective of one or more peers that were actually there. Such an implementation may be extended to recreate environmental effects associated with the venue, so as to simulate playback of a general media stream in the context of that venue.

Figure 13:
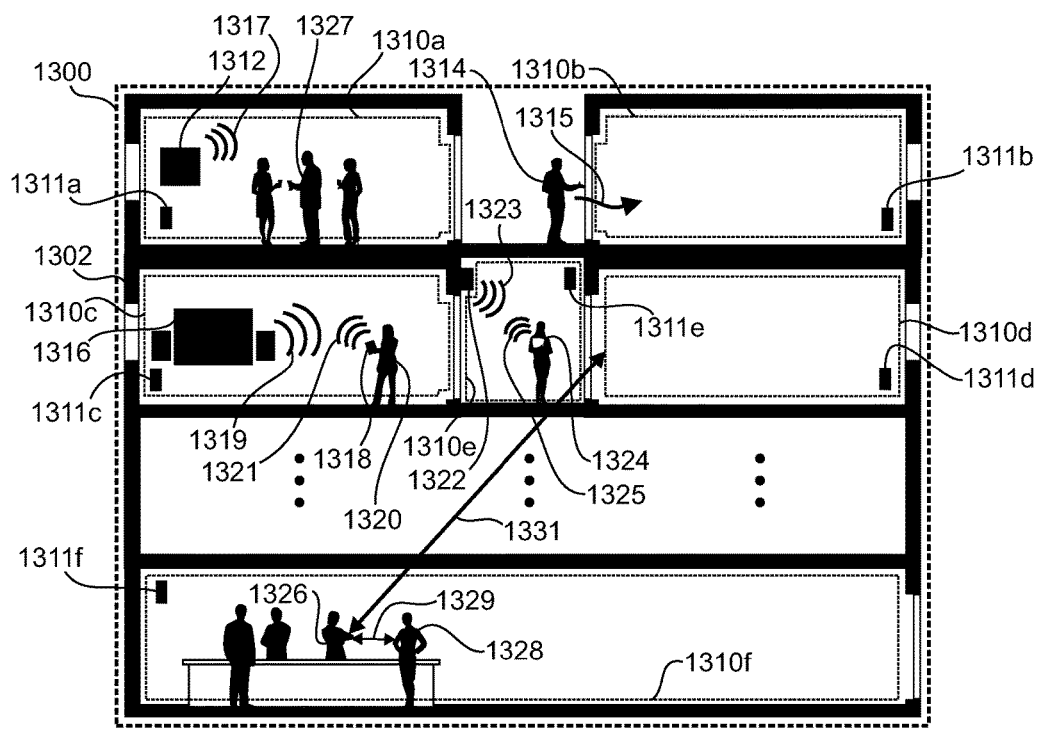
FIG. 13 shows aspects of a media network in accordance with the present disclosure configured for use in a multi-room setting.

FIG. 13 shows aspects of a media network 1300 in accordance with the present disclosure configured for use in a multi-room setting 1302 (e.g. a hotel, a home, an apartment complex, an office building, etc.). The media network 1300 supports a plurality of spatial groups 1310a-f. Each spatial group 1310a-f may be associated with a region (e.g. rooms, auditoriums, hallways, etc.) within the multi-room setting 1302. The media network 1300 may optionally include one or more coordinating peers 1311a-f configured so as to govern one or more aspects of an associated spatial group 1310a-f such as the boundary of the spatial group 1310a-f, the associations of the spatial group 1310a-f, provide a wide area network portal, etc. The media network 1300 may include one or more administrating peers 1326 with sufficient priority level so as to coordinate the media network 1300, assign priority levels and associate peers with groups (spatial groups 1310a-f and/or social groups) within the network 1300.

In one non-limiting example one or more spatial groups 1310a-f within the network may be configured by an assigned peer upon first contact with that peer (i.e. as the assigned peer first enters the spatial group 1310a-f, upon assignment of preferences between the peer and the spatial group 1310a-f, through completion of an agreement, etc.). The media network 1300 may be configured to accept one or more peers 1314, 1318, 1324, 1327, 1328 configured so as to communicate with the media network 1300. In aspects, the peers 1314, 1318, 1324, 1327 may be configured to communicate with one or more groups 1310a-f.

In aspects, a prospective peer 1328 may communicate 1329 with an administrating peer 1326, perhaps as part of an agreement (i.e. checking into a hotel, signing up for an event, etc.). The administrating peer 1326 may associate 1331 a group 1310d with the unique ID of the prospective peer 1328, thus allowing for convenient acceptance of the prospective peer 1328 into the elected group 1310d. Such a procedure may advantageously simplify the process of securely allowing peers to join groups within the media network 1300.

A group 1310a may include one or more peers configured as rendering devices 1312. One or more priority peers 1327 may coordinate (i.e. perhaps via a user interface, etc.), provide (i.e. via access to a media library), and/or direct (i.e. via a streaming application, web service, etc.) one or more media streams for rendering by designated members within the group 1310a. The rendering devices 1312 may be configured to render one or more of the media streams. The media network and/or one or more of the rendering devices 1312 may include a payment system to acknowledge and/or pay for each media stream rendered by the rendering device 1312. Additionally, alternatively, or in combination, the media network may include one or more peers configured so as to monitor the rendered stream, thus providing feedback as to the approximate number of users that listened to the stream. Such a configuration may be advantageous for calculating royalty revenues, etc. associated with public broadcasting of the media stream.

In aspects, a peer 1314 may approach an associated spatial group 1310b. Upon cross over into the spatial group 1310b, the media network may automatically coordinate assignment of the peer 1314 to the group, interface with the peer 1314, perhaps via one or more associated peers (not explicitly shown) within the group 1310b, etc.

In aspects, a peer 1318 may be configured so as to interface with a user 1320 so as to direct 1321 one or more media streams to one or more rendering devices 1316 within a spatial group 1310c in the media network 1300. The rendering devices 1316 may render the associated stream to form a rendered media stream 1319 and thus establish a media field within the spatial group 1310c. The peer 1318 may include an observer functionality in accordance with the present disclosure, configured so as to monitor the local media field within the spatial group 1310c and perhaps adjust the media field and/or direct the media network to adjust the field in accordance with the present disclosure.

In aspects, a peer 1324 may be configured so as to communicate with one or more spatial groups 1310e within the venue 1302. The peer 1324 may communicate with a local peer 1322 so as to establish a localization of the peer 1324 within the venue 1302, to communicate between the peer 1324 and another remote peer within the venue 1302, etc. One or more spatial groups 1310e may be accessible by one or more peers within the media network 1300 (i.e. such as in hallways, auditoriums, etc.). Such accessible spatial groups 1310e may include one or more rendering devices 1322 configured so as to communicate rendered streams 1323 perhaps pertaining to a warning, an alert, an ambient media stream, a recommendation (e.g. an advertisement, a concierge direction, etc.), a combination thereof, or the like. In one usage scenario, such a media network may be configured as an open network, thus allowing any prospective peer to join and listen to one or more streams, but not necessarily to interact at a higher level unless invited to do so (e.g. via a promotion, a payment, etc.).

In aspects, the media network may govern one or more aspects of the local media field within a spatial group 1310a-f. Some non-limiting aspects may include the sound pressure level (i.e. so as to restrict excessively loud sound fields within a shared social venue), restriction of media streams (i.e. based on parental restrictions, etc.), superposition of alerts, warnings, etc. One or more of the aspects may be at least partially governed by the time of day, activity of adjacent spatial groups, presence of the peers within a spatial group, etc.

In one non-limiting application related to a multi-room venue, a perspective peer 1328 or peer 1314 may interact with a keycard so as to join the media network and/or a group within the media network. Some non-limiting examples of keycards include magnetically scanned cards, NFC keycards, ID matrix cards, or the like. Upon interaction between the keycard and the peer (e.g. upon tap, swipe, photograph, etc.), perhaps in combination with an access parameter, online confirmation, etc., the peer may become associated with the media network or a group therein. Thus a prospective peer or peer may become intimately connected with a room or room amenities (speaker systems, media center, lighting, etc.), and media, environmental parameters, etc. may be streamed, configured, and/or adjusted automatically via the peer. The media network may be granted access to a peer related network or service (i.e. a social network, a media streaming service, etc.) so as to automatically acquire and implement peer related preferences, establish peer/group relationships, or the like.

Figure 14:
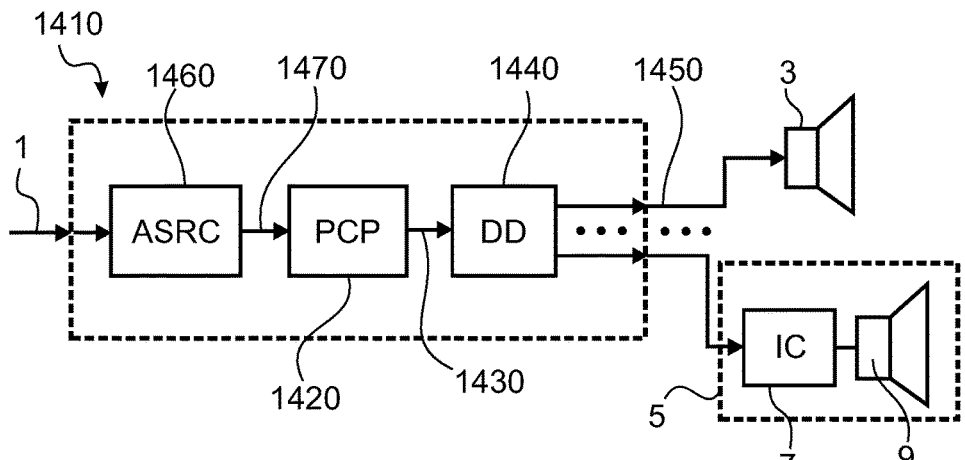
FIG. 14 shows an audio enhancement system included in a peer in accordance with the present disclosure.

FIG. 14 shows a non-limiting example of an audio enhancement system 1410 included in a peer on a media network in accordance with the present disclosure. The audio enhancement system 1410 is configured to accept one or more input audio signals 1 from a source (e.g. a processor, an audio streaming device, an audio feedback device, a wireless transceiver, an ADC, an audio decoder circuit, a DSP, a network peer, etc.), and provides one or more output signals 1450 to one or more transducers 3, or transducer modules 5. The audio enhancement system 1410 includes blocks (e.g. PCP block 1420, DD block 1440, ASRC block 1460, etc.) which are collectively configured to transform the input audio signal 1 to produce the output signal 1450.

The audio enhancement system 1410 may be embedded in an application specific integrated circuit (ASIC) or be provided as a hardware descriptive language block (e.g. VHDL, Verilog, etc.) for integration into a system on chip integrated circuit (ASIC), a field programmable gate array (FPGA), or a digital signal processor (DSP) integrated circuit. One or more blocks (e.g. PCP block 1420, ASRC block 1460, etc.) may also be implemented in software on a consumer electronic device and/or on an associated network (e.g. a local network server, in the cloud, a media network in accordance with the present disclosure, etc.). The system 1410 may be an all-digital hardware implementation. An all-digital implementation may be advantageous to reduce the hardware footprint, reduce power consumption, reduce production costs, and increase the number of integrated circuit processes into which the system may be implemented. The implementation may be integrated into a consumer electronic device in order to provide a complete audio enhancement solution.

As shown in FIG. 14, the audio enhancement system 1410 for inclusion into a peer includes a parametrically configurable processing (PCP) block 1420, a digital driver (DD) block 1440, and an arbitrary sample rate conversion (ASRC) block 1460. The audio enhancement system 1410 accepts one or more audio input signals 1 from an audio source. In the schematic shown, the ASRC block 1460 accepts the input signal 1 and produces a converted signal 1470. The converted signal 1470 is provided to the PCP block 1420, which in turn transforms it into an enhanced signal 1430. The PCP block 1420 may include one or more parameters pertaining to the acoustic signature of the associated peer, environmental factors, etc. The PCP block 1420 may include an algorithm configured to act upon the input signal 1 or the converted signal 1470 to compensate for one or more aspects of the acoustic and/or environmental signature during operation. The enhanced signal 1430 is provided to the DD block 1440, which produces and output signal 1450 from the enhanced signal 1430. Placement of an ASRC block 1460 between the input to the system 1410 and the PCP block 1420 may be advantageous for use in memory constrained devices. In this case, an ASRC block 1460 may allow for the use of a single set of parameters that are irrespective of the sampling rate of the input audio signal 1, for the rest of the processing. An ASRC block 1460 placed at the input to the audio enhancement system 1410 may also remove jitter from the input audio signal 1, which may be advantageous for enhancing the sound quality obtainable from some types of input sources.

By transducer 3, 9 is meant a component or device such as a loudspeaker suitable for producing sound. A transducer 3, 9 can be based on one of many different technologies such as electromagnetic, thermoacoustic, electrostatic, magnetostrictive, ribbon, audio arrays, electroactive materials, and the like. Transducers 3, 9 based on different technologies may require alternative driver characteristics, matching or filtering circuits but such aspects are not meant to alter the scope of this disclosure.

By transducer module 5 is meant a subsystem including both a transducer 9 and a circuit 7. The circuit 7 provides additional functionality (e.g. power amplification, energy conversion, filtering, energy storage, etc.) to enable a driver external to the transducer module 5 to drive the transducer 9. Some non-limiting examples of the circuit 7 (e.g. a passive filter circuit, an amplifier, a de-multiplexer, a switch array, a serial communication circuit, a parallel communication circuit, a FIFO communication circuit, a charge accumulator circuit, etc.) are highlighted throughout the disclosure.

By input audio signal 1 is meant one or more signals (e.g. a digital signal, one or more analog signals, a 5.1 surround sound signal, an audio playback stream, etc.) provided by an external audio source (e.g. a processor, an audio streaming device, an audio feedback device, a wireless transceiver, an ADC, an audio decoder circuit, a DSP, etc.).

By acoustic signature is meant the audible or measurable sound characteristics of a consumer electronic device dictated by its design that influence the sound generated by the consumer electronic device. The acoustic signature is influenced by many factors including the loudspeaker design (speaker size, internal speaker elements, material selection, placement, mounting, covers, etc.), device form factor, internal component placement, screen real-estate and material makeup, case material selection, hardware layout, and assembly considerations amongst others. Cost reduction, form factor constraints, visual appeal and many other competing factors are favored during the design process at the expense of the audio quality of the consumer electronic device. Thus the acoustic signature of the device may deviate significantly from an ideal response. In addition, manufacturing variations in the above factors may significantly influence the acoustic signature of each device, causing further part to part variations that degrade the audio experience for a user. Some non-limiting examples of factors that may affect the acoustic signature of a consumer electronic device include: insufficient speaker size, which may limit movement of air necessary to re-create low frequencies, insufficient space for the acoustic enclosure behind the membrane which may lead to a higher natural roll-off frequency in the low end of the audio spectrum, insufficient amplifier power available, an indirect audio path between membrane and listener due to speaker placement often being on the back of a TV or under a laptop, relying on reflection to reach the listener, among others factors.

Figure 15:
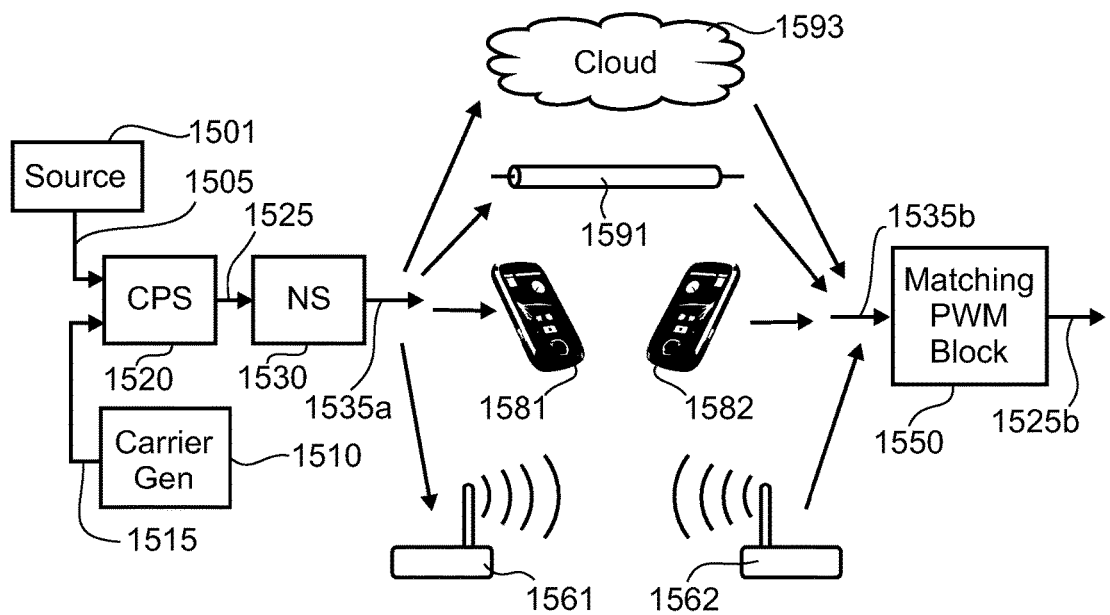
FIG. 15 shows an encoding scheme for implementation between one or more peers inclusion in a media network in accordance with the present disclosure.

FIG. 15 shows an encoding scheme for implementation between one or more peers inclusion in a media network in accordance with the present disclosure. The encoding scheme may be advantageous to provide computationally efficient, low noise, and low switching frequency pulse width modulated playback, streaming and/or reproduction of a signal encoded (e.g. an audio signal, video signal, telemetry signal) at a remote location (i.e. via a peer, a source, etc.). As shown in the FIG. 15, the signal conversion system may be physically split into two portions, a remote portion and a playback portion. The remote portion accepts an input signal 1505 from a source 1501 to a cross-point selection (CPS) block 1520 in accordance with the present disclosure. The remote portion also includes a carrier generator 1510 in accordance with the present disclosure. The carrier generator 1510 creates a carrier signal 1515 that is also fed to the CPS block 1520. The CPS block 1520 is configured to analyze the input signal 1505 and the carrier signal 1515 and generate a triggered signal 1525. The remote portion also includes a noise shaper 1530 in accordance with the present disclosure. The noise shaper 1530 is configured to accept the triggered signal 1525 and perform truncation and noise shaping thereupon to produce a truncated signal 1535a. The truncated signal 1535a may be updated at a rate corresponding to the frequency of the carrier signal 1515 (e.g. once per carrier cycle, twice per carrier cycle, etc.) and may be sufficiently noise shaped and truncated so as to be easily replayed without expensive hardware requirements.

The CPS block 210 may include input and/or output registers to store samples of the resampled signal 150 and triggered signal 215 respectively. The CPS block 210 may include a CPS comparator, configured to compare the resampled signal 150 with the carrier signal 225. In one non-limiting example, the CPS comparator may be configured to update the triggered signal 215 when the carrier signal 225 transitions from being less than to being greater than the resampled signal 150. In another non-limiting example, the CPS block 210 may include a hysteresis function to limit potential noise induced switching of the triggered signal 215 when the carrier signal 225 and the resampled signal 150 are similar in magnitude. Such comparative function may be provided by a switching comparison algorithm, a hardware comparator element, etc. The CPS block 210 may be configured to update the triggered signal 215 in sync with the carrier signal 225 (e.g. when the carrier signal is at a maximum, a minimum, etc.).

The CPS block 1520 may include a noise shaping function (e.g. a noise shaper), configured to insert and/or reshape a random and/or pseudo random noise in the switching comparison algorithm. Such random and/or pseudo random noise may be advantageous for reducing timing related noise on the resampled signal (i.e. thus potentially reducing the overall IMD and/or THD for the signal processing system). In one non-limiting example the noise shaping function may be an $n^{th}$ order $\Delta\text{-}\Sigma$ noise shaper. Each feedback loop in the noise shaper may include a configurable parameter to better help shape the overall noise. In one particular non-limiting example, a $9^{th}$ order noise shaper is used in combination with an absolute threshold of hearing model in order to shape the noise over the audible hearing range. Such a configuration may be advantageous to substantially minimize the audible noise in the system as would be heard by a human user. The noise shaper may be sampled at a frequency higher than the frequency of the carrier signal (e.g. at the clock frequency, at a multiple of the carrier signal frequency, etc.). Such high frequency sampling may be advantageous for shifting the noise to higher, inaudible frequency bands with the noise shaper during operation.

The truncated signal 1535a may be wirelessly transmitted via one or more transmitters 1561, 1562 (e.g. WiFi®, Bluetooth®, etc.), stored to a physical medium 1571 (e.g. a CD, DVD, Blue Ray®, flash memory, cloud storage, etc.) for playback on a corresponding playback device 1572, transferred via a first consumer electronics device 1581 for playback/streaming on a second consumer electronics device 1582, delivered via a wired transmission 1191, and/or transmitted over an internet/cloud 1593 based network to a corresponding playback portion. The playback portion includes a matching pulse-width modulation (PWM) bock 1550 in accordance with the present disclosure. The PWM block 1550 includes a matching carrier generator that generates a carrier signal that corresponds to the same carrier signal used during production of the truncated signal 1535a. The matching PWM block 1550 may be configured to accept an incoming truncation signal 1535b (e.g. a truncation signal 1535a but perhaps provided in a physically different form), and generate the corresponding PWM signal 1555 for delivery to a transducer, filter network, circuit and/or driver in accordance with the present disclosure.

This configuration may be advantageous for providing playback and/or streaming of a high quality signal with reduced driver related switching losses and without expensive hardware in the playback portion (e.g. located on the playback device).

In aspects, the signal 1505 may be uniquely enhanced for playback on the corresponding user/peer device (1582, 1572, playback portion, etc.). In this configuration, the signal processing related to the enhanced playback may be implemented prior to providing the signal 1505 to the CPS block 1520 in the remote portion. Such a configuration may be advantageous for simplifying and or improving a customer experience with an audio streaming process (e.g. a cloud based audio streaming service). In aspects, a user profile stored with an audio streaming service may include one or more audio processing parameters corresponding to the playback portion (e.g. corresponding to the device upon which playback is expected), suitable for optimizing audio output on the intended playback device. Thus an audio stream 1505 from an audio streaming service may be remotely processed in the remote portion before sending the resulting truncated signal 1535a to the matching PWM block 1550 on the consumer electronic device for playback.

One or more peers with higher priority levels, (e.g. hotel personnel, security, etc.) may broadcast alerts, etc. throughout one or more audio spaces (i.e. rooms, hallways, auditoriums, etc.). The media network may further provide control, quality assessment, etc. of media on demand services, streaming functions through the rendering devices (e.g. loudspeakers, media systems, etc.) within one or more groups within the media network (e.g. within hotel rooms, hallways, etc.).

A media network in accordance with the present disclosure may include one or more localization algorithms. The media network may include one or more peers, optionally configured to perform one or more function thereupon, some functions including observers, rendering devices, processing devices, hubs, etc. The localization algorithm may be configured to gather media field information from one or more observers included within the media network. The localization algorithm may be configured to accept one or more aspects of the gathered media field information and extract time delays, audio watermarks, WiFi signals, local RF signal strength, and/or field aspects pertaining to one or more associated rendering devices. At least a portion of a map, positional coordinates, physical relationship between two or more peers, may be output from the localization algorithm. In aspects, the localization algorithm includes a triangulation algorithm that accepts one or more wireless signals from one or more peers in the media network and generates one or more physical relationships between the associated peers.

In aspects, the localization algorithm includes an audio watermark extraction function, configured to separate one or more locally rendered streams generated by one or more rendering devices in the media network from one or more observations of the media field, perhaps established at a plurality of physical locations within the media field. The audio watermark extraction function may be configured to identify a unique audio watermark associated with one or more rendering devices within the network.

In aspects, an associated audio watermark may be serially applied to a plurality of rendering devices within the network during playback of a media stream. The audio watermark extraction function may listen for the audio watermark in addition to taking input of the stream directly from the media network. Thus each instance of the audio watermark may be uniquely tied to a known rendering device within the media network. Analysis of each audio watermark and/or the stream carried along with the audio watermark may be used by the localization algorithm to determine one or more physical/locational aspects of the associated rendering device with respect to one or more of the observers where the rendered stream was monitored.

The audio watermark may include a unique address associated with one or more of the rendering devices (e.g. a MAC-address), a media key associated with access to the media stream (e.g. a DRM key), a spatially oriented group based ID (e.g. a room based ID, social group based access ID, etc.), or the like.

The media network, an observer, a peer, and/or a localizing observer may include one or more devices configured to generate the spatial aspects of network peers or of aspects of the network (for example, location of a television, etc.). Some non-limiting examples of localization devices include infrared, proximity sensors, magnetometers, light emitting diode based network triangulation, wireless signal strength based triangulation, audio sampling based triangulation, audio watermarking based communication and device identification, GPS, wireless network configurations, signal strength assessment, signal strength triangulation (NFC/RFID, local RF signal strength, BT, BLE, Zigbee, Z-wave, ANT, WiFi, proprietary topologies, etc.), a camera (e.g. a digital camera, a stereoscopic camera, a thermographic camera, a camera array, etc.), time of flight audio signaling, combinations thereof, or the like.

In outdoor and limited indoor venues, GPS position may be used, potentially in combination with WiFi and/or RF triangulation to determine the position of one or more peers within the network. Such a configuration may be advantageous for determining one or more localization aspect for one or more peers in the network in large venues, outdoor venues or the like.

Shorter range wireless network communications may be used to assist with, or primarily perform localization functions on the network. In one non-limiting example, such information may be provided by performing triangulation analysis on one or more WiFi, Bluetooth, NFC, RFID nodes in the network.

A localization algorithm may be implemented using multilateration (e.g. time difference of arrival approaches), trilateration (e.g. via time of flight calculations), triangulation (time of flight, determining angular relationships between one or more peers), fuzzy locating, wireless, optical and/or acoustical localization methods. In one non-limiting example, the localization algorithm may incorporate a wireless localization algorithm (e.g. centralized localization, distributed localization, anchor/beacon-based localization, relaxation-based distributed localization, stitching algorithms, multidimensional scaling, proximity based mapping, ad-hoc positioning algorithms, bounding box algorithms, gradient based algorithms, diffusion based algorithms, hybrid localization, interferometric ranging, collaborative multilateral localization, error propagation aware localization, cluster based localization, combinations thereof, and the like). The localization algorithm may include received signal strength indicators, time of arrival indicators (e.g. as part of an acoustic based localization algorithm), angle of arrival (e.g. with appropriate hardware provisions) to assist with the localization process.

The localization algorithm may further implement the combination of received information using one or more computational methods such as hyperbolic trilateration, maximum likelihood estimation, etc. to determine the location of one or more peers in 3D space, to generate a peer map, etc. The algorithm may include steps of generating an initial estimate of location and refining the location map (e.g. via subsequent measurements, combination of techniques, etc.).

In one non-limiting example the media network may rely upon the synchronization service in order to implement an improved interferometric ranging based localization algorithm. In this example, the synchronization service provides nanoscale time synchronization so as to improve the localization aspects of the algorithm.

In one non-limiting example related to an acoustic localization approach (e.g. via a test signal, or watermark based approach), the localization algorithm may include steps of rendering one or more acoustic signals (e.g. impulses, sweeps, chirps, etc.) with one or more peers (optionally sequentially) into the sound field, monitoring for time of flight between the one or more peers and one or more observers (e.g. peers configured as observers) in the sound field, recording the time of flight data for use in the trilateration, maximum likelihood, and/or triangulation aspects of the algorithm, and construction of the location of one or more of the peers/observers in the sound field.

The media network may include one or more pulsed LED lighting nodes, or an observer configured to monitor information from one or more LED lighting nodes. In one non-limiting example, an LED lighting node may be used to broadcast group data into a spatially configured group (e.g. a room), may participate as a peer or an interfacing element for a peer (e.g. an interfacing element to a wired server based peer), may broadcast group configuration data, may broadcast a group ID, etc.

In aspects, an LED lighting node in accordance with the present disclosure may be configured to perform a beacon function, the beacon function may pertain to a series of local room IDs, etc. whereby an observer positioned within the room may accept a light based message from the LED lighting node, so as to localize the peer, interface with the group (e.g. a group associated with the room), etc. The LED lighting node may render a light modulated data signal into the local vicinity thereof, such modulated light may be identified by an associated peer for purposes of streaming, localization, communication or the like. Such a peer may include a photosensor to detect such light modulation. Such capability may be provided as included in a camera system, a smartphone, an infrared communication module, or the like. The power level of the rendered light may be used to help localize the peer within the group space, perhaps via a triangulation algorithm in accordance with the present disclosure.

In aspects, short range communications (e.g. wireless triangulation, LED sensor arrays, etc.) may be configured so as to establish the identity and/or credentials for one or more groups in the media network. Thus, such short range communications may be configured so as to automatically coordinate peer hand over between groups, security management, sign ins, queue management, low level data exchange between peers, purchase management for peers, etc. during operation.

In aspects, a media network in accordance with the present disclosure may include one or more peers configured so as to adjust the media stream played thereupon (e.g. via an audio enhancement system in accordance with the present disclosure, etc.). The media network may be configured to recognize the identity of a peer based upon the signature (i.e. stream adjustments) generated by that peer. Thus the media network may include one or more configuration algorithms, one or more localization algorithms, etc. configured so as to compare the intended media stream(s) and the rendered streams as monitored by one or more observers in the media space so as to determine the configuration of peers, the location of peers within the network, and/or field enhancement of the peers during playback of the media stream. The media network algorithms may be configured to insert one or more timing signals, etc. into the media stream, perhaps uniquely to each of the peers, so as to more easily extract configuration and/or localization information therefrom.

A media network in accordance with the present disclosure may include a plurality of peers configured to support a real-time gaming application. The real-time gaming application may include passage of media streams amongst peers within the network. The media network may designate one or more rendering devices amongst the peers within the network. Based on actions taken within the game, one or more of the peers may become designated as rendering devices or demoted therefrom (e.g. in an interactive karaoke queuing application, during a conference question and answer period, etc.). Some non-limiting examples include trivia based queuing of media streams, virtual auctions, virtual auctioning of queued media streams, media voting systems, and the like.

In one non-limiting example, the real-time gaming application is an auction, the media network supporting a collection of local peers (e.g. peers at an auction site) as well as one or more remote peers (e.g. peers participating from a remote location). The media network may include a synchronization service in accordance with the present disclosure, to manage media delivery between peers on the network. In addition, the media network may display images, video, etc. in real-time along with an associated audio stream. Such information may be distributed to each peer within the network, while peer responses (i.e. questions, bids, etc.) may be directed to one or more priority peers (e.g. an auctioneer, a coordinator, etc.). The media network may reduce overall traffic flow on the network by deprioritizing media transfer to peers that are not focused on the articles at hand, etc.

In another non-limiting example, the media network may be configured to support a real-time gaming application. The media network may include a plurality of peers, each peer configured to represent a character in the gaming application. The media network may include one or more game spaces (e.g. spatial groups in accordance with the present disclosure). Each character may include a voice augmentation module (e.g. so as to modify the voice of the character in real-time), supporting cast (e.g. companion AIs, familiars, etc.), special effects (e.g. related to actions taken by the character, etc.), or the like. One or more characters may be attached to a user (e.g. a human user, an AI, etc.) which directs the actions of the character in the game space. It is envisaged that each human user may interface with the game space via one or more augmentation devices. Some non-limiting examples of augmentation devices include audio communication devices (e.g. ear buds, microphones, etc.) and optionally visual augmentation hardware (e.g. heads up display glasses, etc.). Each augmentation device or collection thereof may be a peer or support a peer on the media network. Such configurations may be advantageous for augmenting the playing field for human users within the game space. Visual augmentation hardware may overlay a component in the game space, while audio communication devices may generate local sound fields (e.g. wave-fields) representative of the game space. The human user may interact with the actual game space, along with the augmented aspects (e.g. audio and visual) as supported and coordinated by the media network.

In another non-limiting example, the media network may be configured to accept inputs from wireless appliances or the like. In one non-limiting example, a near field communication (NFC) tag placed physically within the vicinity of the media network may provide means for localizing a peer within the network (e.g. via wireless beacon triangulation, location based identification, proximity detection, etc.), assign/remove rights from a peer within the network (e.g. so as to allow/prevent rendering, observing, provide access to a stream, provide access to a group, designate group priorities, etc.).

In one non-limiting example, a double key based approach is used to easily maintain secure yet intuitive handoff of peers to groups within the media network. In one non-limiting example, a passkey may be assigned to the unique ID of a peer within the network. When the peer comes into communication range with an associated NFC chip, the unique ID of the peer is combined with the unique ID of the NFC chip to automatically unlock access to a group, assign the peer to a group, designated a function on the group, give a peer priority within a group, combinations thereof, or the like.

One or more peers included in a media network in accordance with the present disclosure may be a mobile peer, capable of moving throughout the space, controllably switch between functions including observer, rendering, processor, or combinations thereof. The media network may include a configuration service for automatically controlling such functional relationships in accordance with changes in the spatial configuration of the network, changes in the media field associated with physical locations of peers, etc.

In aspects, one or more mobile peers may be configured so as to conserve power there upon during use. The media network may redistribute computational load, observer functions, etc. off of a power constrained mobile peer so as to extend the battery life thereof.

In aspects, the media network may be programmed to coordinate the smooth transfer of a peer from a first group to a second group within the network. The peer may include an observer function to evaluate the media transfer during the transfer process. The peer may be configured to monitor the local media field during the transfer and to direct such information to the media network. The media network may include a sound field management function configured to adjust the sound levels of one or more rendering devices (potentially in the first group and/or the second group) so as to seamlessly transfer the peer from the first group to the second group while maintaining the desired sound pressure levels at the location of the peer during the transfer process.

In aspects, the media network may be programmed to coordinate the sound field around a plurality of peers, each peer observing a unique media stream. The network may be configured to manage (through feedback from one or more peers) the sound field in the vicinity of one or more peers in order to minimize cross talk between media streams, interweave streams based on the proximity between users, etc. Such a configuration may be advantageous for minimizing cross talk between users who may be listening to alternative media streams, while in substantially close proximity to each other.

In aspects, a media network in accordance with the present disclosure may maintain a sound field, substantially centered around a priority peer. As a priority peer moves throughout the media network, the media network may be configured to adjust the local rendering of the media stream so as to maintain the desired field, while substantially minimizing the sound pressure level in regions not associated with the priority peer.

In aspects, the media network may be configured to support variable user priorities for spatially organized groups. Thus a group space may become "occupied" if taken over by a peer, such that if a second peer, enters into the group, it may not be able to direct media flow in that space. In addition, if a lower priority peer progresses into another peer's group, the media heard by the lower priority peer may progressively fade so as not to interfere with the priority peer's environment. The media network may support functionality so as to override such settings in the event that they want to participate in the impinging media stream. Thus the media network may be configured to support localized sound fields around one or more peers connected to the network. Unoccupied spatially organized groups may be made available to peers on a "first come first serve" basis.

It will be appreciated that additional advantages and modifications will readily occur to those skilled in the art. Therefore, the disclosures presented herein and broader aspects thereof are not limited to the specific details and representative embodiments shown and described herein. Accordingly, many modifications, equivalents, and improvements may be included without departing from the spirit or scope of the general inventive concept as defined by the appended claims and their equivalents.

What is claimed is:

1. A method for rendering a media stream with one or more peers, which includes one or more observers, over a network to generate a shared media field, the method comprising:
   designating a portion of the one or more peers as rendering devices, which are located at a venue, for rendering the media stream, each rendering device including at least one rendering property affecting rendering of the media stream therefrom;
   providing network connections between the one or more peers, the network connections supporting a media service, wherein the media stream is provided to at least one of the one or more peers;
   distributing, by a peer of the one or more peers, at least a portion of the media stream to other peers of the one or more peers via the network connections when the peer receives the at least a portion of the media stream;
   rendering a stream, by the rendering devices, from a portion of the distributed portion of the media stream to form a local rendered stream at the venue;
   observing, by the one or more observers, the rendered stream;
   generating, by the one or more observers, a correction signal for the rendering devices in response to the rendered stream; and
   adjusting at least one of the rendering properties of the rendering devices based on the correction signal to form a desired stream,
   wherein the stream rendered by each rendering device contributes to the shared media field at the venue, and
   wherein the desired stream includes a predetermined quality, which includes a stream propagation direction, a timing preference, and a preferred sound field configuration.

2. The method in accordance with claim 1, wherein the adjusting at least one of the rendering properties is performed by the media service, and/or at least one of the one or more peers.

3. The method in accordance with claim 1, wherein the media service coordinates and/or synchronizes the media rendering on one or more of the rendering devices.

4. The method in accordance with claim 1, further comprising reporting at least one rendering parameter,
   wherein the rendering parameter is a latency parameter, and
   wherein the adjusting the at least one of the rendering properties comprises adjusting the latency parameter to synchronize the media rendering on one or more of the rendering devices.

5. The method in accordance with claim 1, further comprising reporting at least one rendering parameter selected from the group consisting of an acoustic parameter, an audio lag, an audio spectral response, an audio glitch, an echo, a sound pressure level, and combinations thereof.

6. The method in accordance with claim 1, wherein at least one of the one or more peers reports one or more parameters relating to one or more of its rendering properties, computational capabilities, available resources, available energy reserve, or any combination thereof to one or more peers on a local area network.

7. The method in accordance with claim 1, wherein at least a portion of the adjustment is provided by the media service.

8. The method in accordance with claim 1, further comprising determining a location of the one or more peers in the network using a localization algorithm.

9. The method in accordance with claim 1, wherein the correction signal is used as an input to a localization algorithm.

10. A media network for rendering a media stream to generate a shared media field, the media network comprising:
    a plurality of peers interconnected therebetween via a local area network, at least one peer as a rendering device and at least one peer as an observer, which are located at a venue, the rendering device including one or more rendering properties, the rendering device accepting at least a portion of the media stream or a stream generated therefrom and rendering at least the portion of the media stream to form an individual rendered stream at the venue, the observer observing the individual rendered stream and generating a correcting signal in response to the individual rendered stream, wherein a relationship between the accepted stream and the individual rendered stream is dependent upon the one or more rendering properties; and
    a media service distributing at least a portion of the media stream or a stream generated therefrom over the local area network to the rendering device, the media service and/or one or more of the peers calculating a compensation factor for and/or adjusting at least one rendering property of the rendering device based on the correction signal to form a desired individual stream,
    wherein the individual rendered stream of each rendering device contributes to the shared media field at the venue,
    wherein the rendering device distributes the portion of the media stream to other peers of the plurality of peers, and
    wherein the desired individual stream includes a predetermined quality, which includes a stream propagation direction, a timing preference, and a preferred sound field configuration.

11. The media network in accordance with claim 10, wherein one or more peers is a consumer electronics device selected from the group consisting of a smartphone, a tablet computer, a stereo sound system, a loudspeaker, a television, a headset, a heads up display, and any combination thereof.

12. A media network for rendering a media stream to generate a shared media field, the media network comprising:
- a plurality of peers interconnected therebetween via a local area network, one or more peers configured as rendering devices and observers, which are located at a venue, each rendering device including one or more rendering properties, each of the rendering devices receiving an input stream and rendering at least a portion of the input stream to produce an individual rendered stream at the venue, the individual rendered stream dependent upon the rendering properties, each observer observing individual rendered streams rendered by the rendering devices and generating a correction signal in response to the individual rendered streams; and
- a media service distributing at least a portion of the media stream over the local area network to the rendering devices, the one or more peers, and/or the media service adjusting one or more individual rendered streams to adjust at least one rendering property of at least one rendering device based on the correction signal to form a desired stream,
- wherein the individual rendered streams of each rendering device contributes to the shared media field at the venue,
- wherein each of the rendering devices distributes another portion of the media stream to other peers of the plurality of peers when each of the rendering devices receives the another portion of the media stream, and
- wherein the desired stream includes a predetermined quality, which includes a stream propagation direction, a timing preference, and a preferred sound field configuration.

13. The media network in accordance with claim 12, wherein at least one of the one or more peers is a media source, the media source providing the media stream to the one or more peers via the media service.

14. The media network in accordance with claim 12, wherein at least one of the one or more peers provides a portal to a wide area network to receive or send at least a portion of the media stream.

15. The media network in accordance with claim 12, wherein the media service comprises a real-time transport protocol synchronizing two or more of the individual rendered streams.

16. The media network in accordance with claim 12, wherein two or more of the rendering devices generate a media field through coordinated rendering of the media stream.

17. The media network in accordance with claim 12, wherein the media service comprises a compensation algorithm, the compensation algorithm generating a virtual peer at a predetermined location within a media field.

18. The media network in accordance with claim 12, wherein one or more observers move throughout a media field.

19. The media network in accordance with claim 12, wherein the one or more peers is physically located within a media field and is selectively designated as a rendering device dependent upon a location of the one or more peers with the media field.

* * * * *